United States Patent
Bhatkar et al.

(10) Patent No.: US 9,807,849 B2
(45) Date of Patent: Oct. 31, 2017

(54) AUTOMATICALLY COMMISSIONING LIGHTING CONTROLS USING SENSING PARAMETERS OF THE LIGHTING CONTROLS

(71) Applicants: Anup Bhatkar, Pune (IN); Tanuj Mohan, Mountain View, CA (US); Premal Ashar, Sunnyvale, CA (US)

(72) Inventors: Anup Bhatkar, Pune (IN); Tanuj Mohan, Mountain View, CA (US); Premal Ashar, Sunnyvale, CA (US)

(73) Assignee: enLighted, Inc., Sunnyvale, CA (US)

( * ) Notice: Subject to any disclaimer, the term of this patent is extended or adjusted under 35 U.S.C. 154(b) by 858 days.

(21) Appl. No.: 14/194,684

(22) Filed: Mar. 1, 2014

(65) Prior Publication Data
US 2014/0175990 A1    Jun. 26, 2014

Related U.S. Application Data

(63) Continuation-in-part of application No. 14/040,640, filed on Sep. 28, 2013, which is a continuation-in-part
(Continued)

(51) Int. Cl.
*H05B 37/02* (2006.01)
*G05B 15/02* (2006.01)
*G01S 11/12* (2006.01)

(52) U.S. Cl.
CPC ..... *H05B 37/0218* (2013.01); *H05B 37/0227* (2013.01); *H05B 37/0245* (2013.01);
(Continued)

(58) Field of Classification Search
CPC ............ H05B 37/0218; H05B 37/0227; H05B 37/0245; G05B 2219/2642; G05B 15/02; Y02B 20/46; G01S 11/12
See application file for complete search history.

(56) References Cited

U.S. PATENT DOCUMENTS 5,101,141 A    3/1992  Warner et al.
5,179,324 A    1/1993  Audbert
(Continued)

OTHER PUBLICATIONS

Gupta, V., "Distributed Estimation and Control in Networked Systems", Aug. 2006, Doctor of Philosophy Dissertation, California Institute of Technology, p. 1-254.*
(Continued)

*Primary Examiner* — Mohammad Ali
*Assistant Examiner* — Kelvin Booker
(74) *Attorney, Agent, or Firm* — Brian R. Short

(57) ABSTRACT

Apparatuses, methods, and systems for automatically commissioning lighting controls using sensing parameters of the light controls are disclosed. One embodiment includes a building control system. The building control system includes a plurality of sensors, a plurality of lights associated with the plurality of sensors, and a controller. The controller is operative to receive sense signals from the plurality of sensors, and generate a graph based on the sensed signals, wherein the graph includes nodes that represent light locations, and edges that represent distances between the lights. For an embodiment, the controller further operative to performing inexact graph matching between a floor plan graph and the sensor graph, thereby automatically commissioning the plurality of lights based on the sensed signals of the plurality of sensors.

27 Claims, 25 Drawing Sheets

Related U.S. Application Data of application No. 12/874,331, filed on Sep. 2, 2010, now Pat. No. 8,587,225, which is a continuation-in-part of application No. 12/584,444, filed on Sep. 5, 2009, now Pat. No. 8,457,793.

(60) Provisional application No. 61/191,636, filed on Sep. 10, 2008.

(52) U.S. Cl.
CPC .............. *G01S 11/12* (2013.01); *G05B 15/02* (2013.01); *G05B 2219/2642* (2013.01); *Y02B 20/46* (2013.01)

(56) References Cited

U.S. PATENT DOCUMENTS

| | | | |
|---|---|---|---|
| 5,191,265 A | 3/1993 | D'Aleo et al. | |
| 5,283,516 A | 2/1994 | Lohoff | |
| 5,812,422 A | 9/1998 | Lyons | |
| 5,841,673 A * | 11/1998 | Kobayashi | G06F 17/5031 716/108 |
| 5,878,407 A * | 3/1999 | Olgac | G06F 17/509 |
| 5,896,139 A * | 4/1999 | Strauss | G06T 17/20 345/440 |
| 6,057,654 A | 5/2000 | Cousy et al. | |
| 6,161,078 A * | 12/2000 | Ganley | G06F 17/5072 345/440 |
| 6,188,181 B1 | 2/2001 | Sinha et al. | |
| 6,342,994 B1 | 1/2002 | Cousy et al. | |
| 6,548,967 B1 | 4/2003 | Dowling et al. | |
| 7,309,985 B2 | 12/2007 | Eggers et al. | |
| 7,348,736 B2 | 3/2008 | Piepgras et al. | |
| 7,382,271 B2 | 6/2008 | McFarland | |
| 7,437,596 B2 | 10/2008 | McFarland | |
| 7,499,515 B1 * | 3/2009 | Beadle | H04L 1/0026 375/358 |
| 7,550,931 B2 | 6/2009 | Lys et al. | |
| 7,566,137 B2 | 7/2009 | Veskovic | |
| 7,623,042 B2 | 11/2009 | Huizenga | |
| 7,792,956 B2 | 9/2010 | Choong et al. | |
| 7,812,543 B2 | 10/2010 | Budike, Jr. | |
| 7,925,384 B2 | 4/2011 | Huizenga et al. | |
| 8,085,672 B2 * | 12/2011 | Subramanian | H04L 45/122 370/238 |
| 8,457,793 B2 * | 6/2013 | Golding | H05B 37/00 700/275 |
| 8,587,225 B2 * | 11/2013 | Ashar | G01S 11/12 315/291 |
| 2002/0122003 A1 * | 9/2002 | Patwari | G01C 21/206 342/450 |
| 2004/0002792 A1 | 1/2004 | Hoffknecht | |
| 2004/0077354 A1 * | 4/2004 | Jason | H04W 8/005 455/450 |
| 2005/0169643 A1 | 8/2005 | Franklin | |
| 2006/0039371 A1 * | 2/2006 | Castro | H04L 12/42 370/389 |
| 2006/0056370 A1 * | 3/2006 | Hancock | H04B 7/2606 370/338 |
| 2006/0168205 A1 * | 7/2006 | Barron | H04L 41/12 709/224 |
| 2006/0275040 A1 | 12/2006 | Franklin | |
| 2007/0057807 A1 | 3/2007 | Walters et al. | |
| 2007/0061050 A1 | 3/2007 | Hoffknecht | |
| 2007/0086128 A1 | 4/2007 | Lane et al. | |
| 2007/0177511 A1 * | 8/2007 | Das | H04L 45/42 370/238 |
| 2007/0215794 A1 | 9/2007 | Cernasov et al. | |
| 2007/0250212 A1 * | 10/2007 | Halloran | A47L 5/30 700/245 |
| 2008/0071892 A1 * | 3/2008 | Muro | H04L 41/06 709/221 |
| 2008/0151761 A1 * | 6/2008 | Theisen | H04W 24/08 370/241 |
| 2008/0151762 A1 * | 6/2008 | Armstrong | H04W 24/08 370/241 |
| 2008/0152046 A1 * | 6/2008 | Armstrong | H04J 3/0658 375/343 |
| 2008/0153423 A1 * | 6/2008 | Armstrong | H04W 24/06 455/67.14 |
| 2008/0185597 A1 | 8/2008 | Wu | |
| 2008/0244104 A1 | 10/2008 | Clemente | |
| 2008/0253298 A1 * | 10/2008 | Bhatti | H04L 45/02 370/252 |
| 2008/0253608 A1 * | 10/2008 | Long | G06K 7/14 382/100 |
| 2008/0265796 A1 | 10/2008 | Null | |
| 2009/0026966 A1 | 1/2009 | Budde et al. | |
| 2009/0156126 A1 * | 6/2009 | Willis | G01S 5/0226 455/41.3 |
| 2009/0179596 A1 | 7/2009 | Willaert et al. | |
| 2009/0195161 A1 | 8/2009 | Lane et al. | |
| 2009/0228318 A1 * | 9/2009 | Ara | G06Q 10/06398 705/7.42 |
| 2009/0234538 A1 * | 9/2009 | Ta | B62D 5/046 701/41 |
| 2010/0034386 A1 | 2/2010 | Choong et al. | |
| 2010/0135186 A1 | 6/2010 | Choong et al. | |
| 2010/0191186 A1 * | 7/2010 | Blumberg, Jr. | A61M 5/1413 604/151 |
| 2010/0264846 A1 | 10/2010 | Chemel et al. | |
| 2010/0270933 A1 | 10/2010 | Chemel et al. | |
| 2010/0280677 A1 | 11/2010 | Budike, Jr. | |
| 2010/0295482 A1 | 11/2010 | Chemel et al. | |
| 2010/0301777 A1 | 12/2010 | Kraemer | |
| 2011/0031897 A1 | 2/2011 | Henig et al. | |
| 2011/0199020 A1 | 8/2011 | Henig et al. | |
| 2013/0006899 A1 | 1/2013 | Cook | |
| 2013/0227114 A1 * | 8/2013 | Vasseur | H04L 41/044 709/224 |
| 2014/0031987 A1 * | 1/2014 | Ericsson | G05B 15/02 700/275 |
| 2014/0126426 A1 * | 5/2014 | Vasseur | H04L 45/48 370/256 |
| 2014/0222213 A1 * | 8/2014 | Mohan | G05B 15/02 700/275 |
| 2014/0328211 A1 * | 11/2014 | Holleis | H04L 41/145 370/254 |
| 2015/0177716 A1 | 6/2015 | Hyman et al. | |
| 2015/0234366 A1 | 8/2015 | Hyman et al. | |
| 2017/0164320 A1 * | 6/2017 | Holleis | H04W 64/003 |

OTHER PUBLICATIONS

A. H. Land and A. G. Doig (1960). "An automatic method of solving discrete programming problems". Econometrica 28 (3). pp. 497-520. doi:10.2307/1910129.

* cited by examiner

| LCS_ID | TIMESTAMP | MOTION_DETECTED |
|---|---|---|
| 1 | 2012-16-24 14:10:00 | 0111100101000010010100011001101100000000110011110101001101 |
| 2 | 2012-16-24 14:10:00 | 0100001111000010010100011001101100000000110011110101001101 |
| 3 | 2012-16-24 14:10:00 | 0000000101000010010100011001101100000000110011110101011101 |
| 4 | 2012-16-24 14:10:00 | 1111111101000010010100011001101100000000110011110101001101 |
| 5 | 2012-16-24 14:10:00 | 0101000101000010010100011001101100000000110011110101001101 |
| | | |
| | | |

↑ Motion Sensor     ↑ Time of Motion     ↑ Signature of Motion

FIGURE 7

| LCS_ID1 | LCS_ID2 | LQI |
|---|---|---|
| 1 | 2 | 236 |
| 1 | 3 | 232 |
| 1 | 4 | 160 |
| 2 | 3 | 96 |
| 2 | 4 | 16 |
| 2 | 5 | 230 |
| | | |

↑ Electromagnetic Signal Source

↑ Fixture(s) That Receive The Electromagnetic Signal

↑ Value of the LQI

FIGURE 11

Floor Plan Graph

| X1  | X2  | X3  | X4  | X5  | X6  |
|-----|-----|-----|-----|-----|-----|
| X7  | X8  | X9  | X10 | X11 | X12 |
| X13 | X14 | X15 | X16 | X17 | X18 |
| X19 | X20 | X21 | X22 | X23 | X24 |
| X20 | X21 | X22 | X23 | X29 | X30 |
| X31 | X32 | X33 | X34 | X35 | X36 |

FIGURE 16

AUTOMATICALLY COMMISSIONING LIGHTING CONTROLS USING SENSING PARAMETERS OF THE LIGHTING CONTROLS

RELATED APPLICATIONS

This patent application is a continuation-in-part (CIP) of U.S. patent application Ser. No. 14/040,640, filed Sep. 28, 2013, which is a CIP of U.S. patent application Ser. No. 12/874,331, filed Sep. 2, 2010, which is a CIP of Ser. No. 12/584,444 filed Sep. 5, 2009.

FIELD OF THE EMBODIMENTS

The described embodiments relate generally to control systems. More particularly, the described embodiments relate to methods, apparatuses and systems for automatically commissioning lighting controls using sensing parameters of the lighting controls.

BACKGROUND

Sensors within a structure can be utilized for automatically control lighting, and conserver use of energy to power with lighting. The sensors include, for example, motion sensors and light sensors. However, automated lighting control systems can be difficult to design, and can include high costs of installation. The installation process typically includes a commissioning process which can be time consuming and expensive.

It is desirable to have a method, system and apparatus for automatically, simply and inexpensively performing commissioning of automatic lighting control systems.

SUMMARY

One embodiment includes a method of locating lights of a structure. The method includes sensing signals, by a plurality of sensor units wherein the plurality of sensor units are associated with a plurality of lights, and generating a graph based on the sensed signals, wherein the graph includes nodes that represent light locations, and edges that represent distances between the lights.

Another embodiment includes a building control system. The building control system includes a plurality of sensors, a plurality of lights associated with the plurality of sensors, and a controller. The controller is operative to receive sense signals from the plurality of sensors, and generate a graph based on the sensed signals, wherein the graph includes nodes that represent light locations, and edges that represent distances between the lights.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 7 show samples of data generated by a plurality of motion sensor units, according to an embodiment.

FIG. 11 shows an example of data generated by an LQI sensor unit, according to an embodiment.

FIG. 16 shows a floor plan graph according to an embodiment.

DETAILED DESCRIPTION

Figure 1:
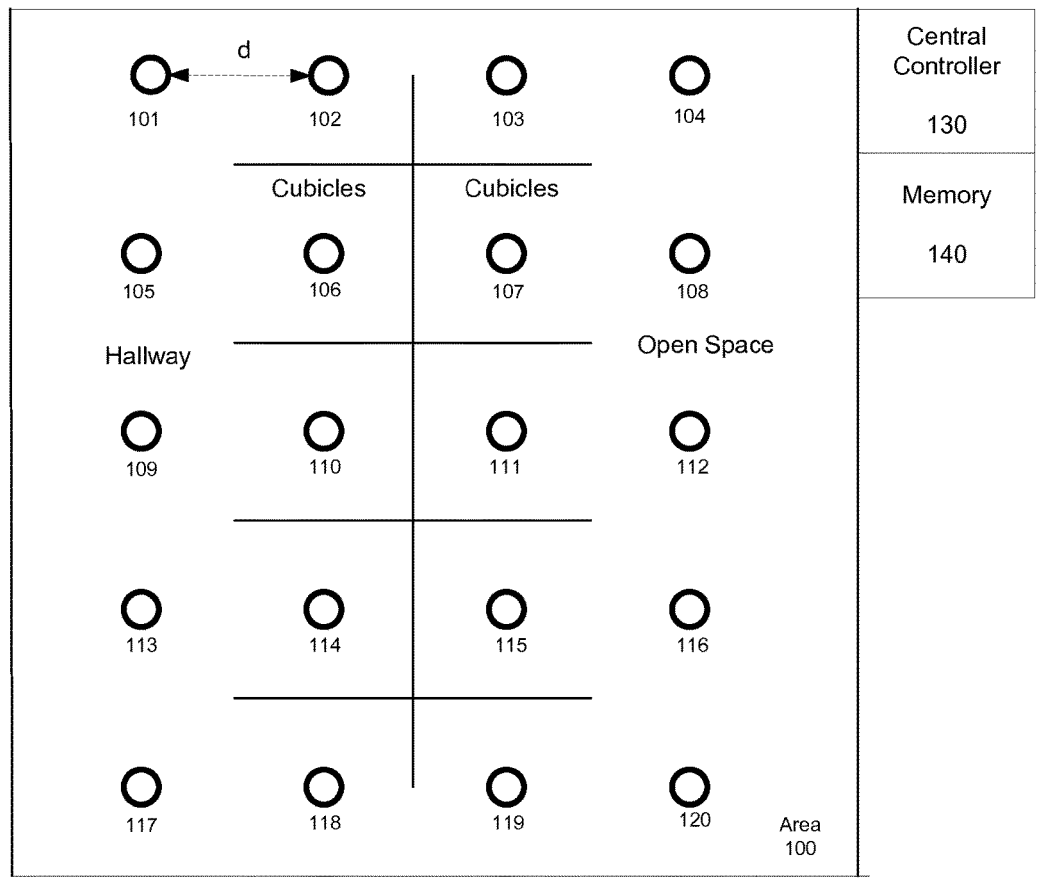
FIG. 1 shows an area that includes multiple fixtures that include sensors and/or lights, according to an embodiment.

As shown in the drawings, the described embodiments provide methods, apparatuses, and systems for automatically, simply and inexpensively performing commissioning of automatic lighting control systems. An embodiment includes commissioning of lighting controls onto a floor plan using sensing parameters of the lighting controls. For at least some embodiments, the commissioning includes generating a sensor graph that include information of relationships (such as, which sensors are neighbors, estimated distances between the sensors, and confidences of the estimates of the distances) between sensors (and/or fixtures) of an area that is obtained through sensing and/or control of the sensors and/or lighting fixtures associated with the sensors. Further, the commissioning includes matching the sensor graph with a floor plan graph, wherein the floor plan graph is generated based on a known floor plan of the area. For an embodiment, the matching provides an identification of where each of the sensors of the area is located. Further, for an embodiment, the matching further provides a quality of the matching that reflects a confidence level of the matching.

FIG. 1 shows an area 100 that includes multiple fixtures 101-120, according to an embodiment. For an embodiment, each fixture 101-120 includes one or more sensors, a lighting controller, and a light. For other embodiments, each of the fixtures 101-120 includes at least one sensor. For at least some embodiments, the fixtures 101-120 are dispersed within a structure that includes the area 100. As shown, the fixtures 101-120 can be deployed within cubicles, hallways and open spaces within the area 100. Once deployed, the locations of the fixtures 101-120 within the building are recorded for future reference, and for building control utilizing the fixtures 101-120. After deployed, a commissioning process is completed to determine the location of each of the fixtures 101-120.

For an embodiment, the fixtures 101-120 are interfaced with a controller 130. For an embodiment, each fixture 101-120 is directly connected to the controller 130. For another embodiment, links exist between the fixtures, allowing a fixture to be connected to the controller 120 through one or more other fixtures. For example, the fixtures 101-120 can form a wireless mesh network, and links between fixtures and other devices can include links through other fixtures. For an embodiment, the controller 130 receives information from the fixtures, and controls an environmental condition (such as, lighting or heating) within the area 100. During commissioning, for an embodiment, the controller 130 receives information that includes at least sensed signals of sensors of the fixtures 101-120 within the area. Based on the sensed signals, the controller 130 automatically performs a commissioning process in which a location (both absolute locations and locations relative to other fixtures) of each fixture is determined. Once determined, the location of each of the sensors and/or fixtures is stored in memory 140 for future reference.

While shown as a separate controller 130, for at least embodiments, the processing of the controller 130 is distributed amongst the controller of each of the fixtures. For other embodiments, the processing of the controller 130 is self-contained within a remote controller 130.

Figure 2:
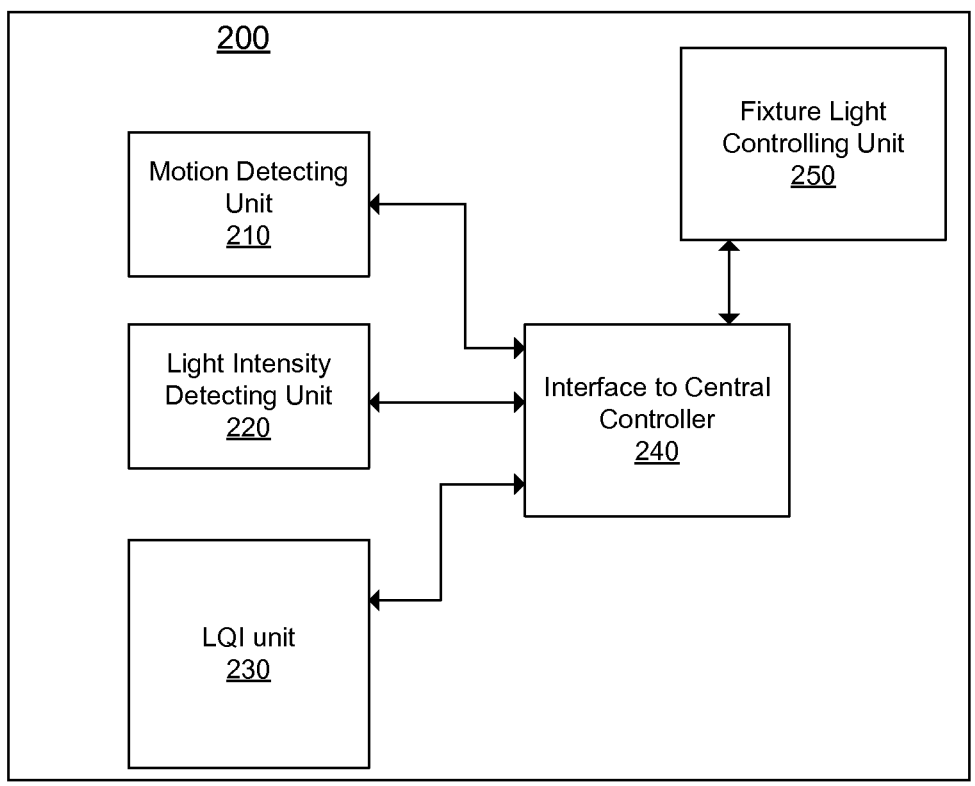
FIG. 2 shows a lighting fixture of a lighting system, according to an embodiment.

FIG. 2 shows a lighting fixture 200 of a lighting system, according to an embodiment. As shown, for this embodiment the lighting fixture 200 includes a motion detecting unit (motion sensor unit) 210, a light intensity detection unit (light intensity sensor unit) 220, an LQI unit (electromagnetic signals transmitter and receiver) 230, a controller/interface 240, and a light controller unit 250.

The motion detecting unit 210 sensed motion proximate to the fixture 200. The light intensity detection unit 220 senses the intensity of light proximate to the fixture 200. It should be noted, that for at least some embodiments, at least one light associated with the fixture 200 emits light. The LQI unit both senses (receives) electromagnetic signals proximate to the fixture 200, and for at least some embodiments, also emits (transmits) and electromagnetic signal.

The controller/interface 240 receives the sensed signals of the motion detecting unit 210, the light intensity detection unit 220, and the LQI unit 230 and provides the sensed signals to the central controller 130. At least one of the controller/interface 240 and the central controller 130 provides control information to the light controller unit 250 for controlling one or more light associated with the fixture 200.

For an embodiment, based on the sensed signal of one or more of the motion detecting unit 210, the light intensity detection unit 220, and the LQI unit 230 the central controller 130 generates graphs that include estimated locations of each of multiple fixtures including the fixture 200. For an embodiment, the central controller 130 further places the fixtures on an existing floor plan, thereby generating a floor plan graph of the area in which the fixtures are located that includes the locations of all of the fixtures. While describes as controlling light, it is to be understood that for at least some embodiments, the fixture additionally or alternatively control another environmental parameter, such as, heat or cooling (HVAC).

Figure 3:
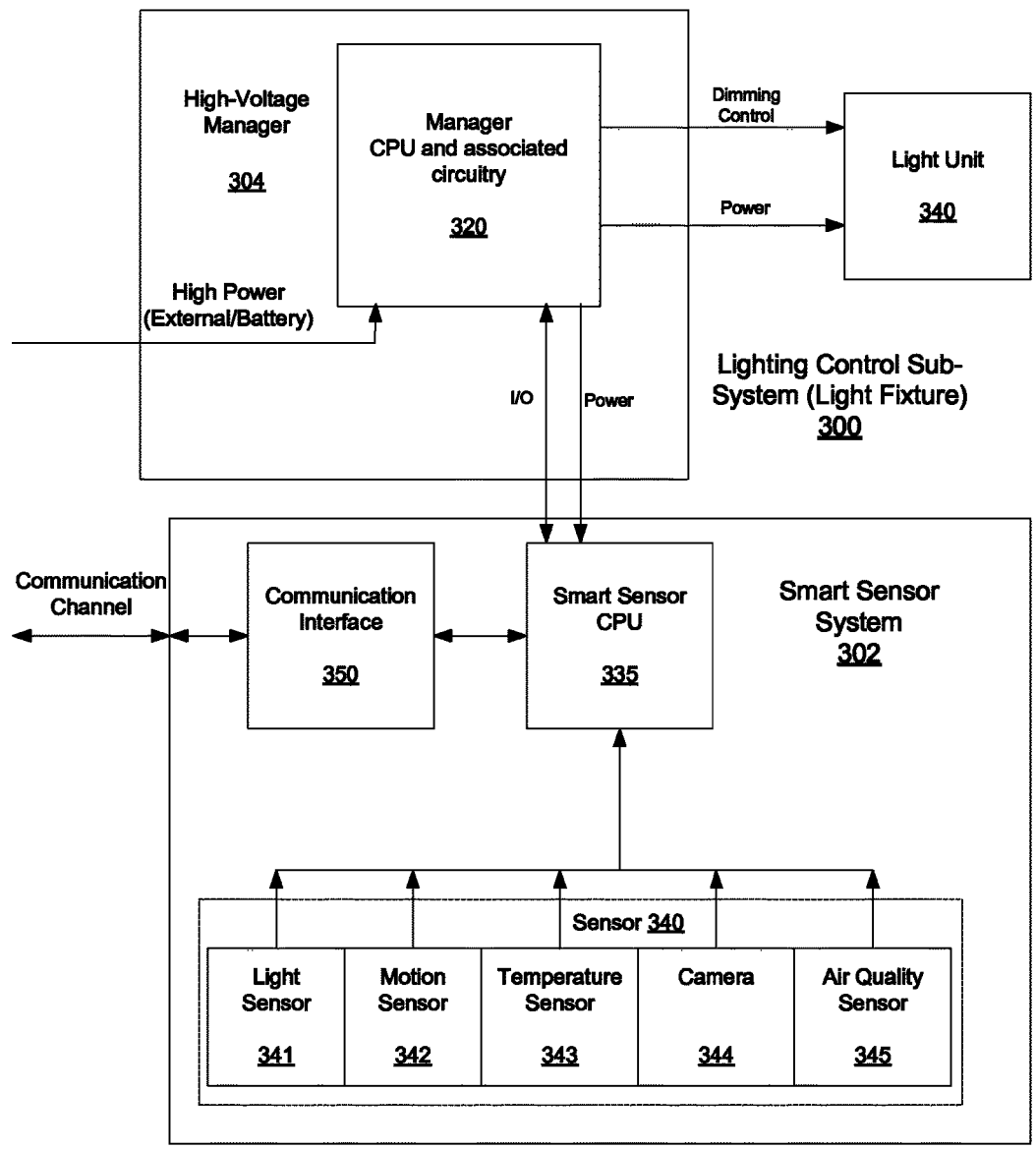
FIG. 3 shows a lighting fixture of a lighting system, according to another embodiment.

FIG. 3 shows sensor and associated lighting control (fixture), according to an embodiment. A sensor and associated lighting control fixture 300 includes a smart sensor system 302 that is interfaced with a high-voltage manager 304, which is interfaced with a luminaire 340. The sensor and associated lighting control of FIG. 3 is one exemplary embodiment of the sensors utilized for occupancy detection. Many different sensor embodiments are adapted to utilization of the described embodiments for occupant sensing and motion. For at least some embodiments, sensors that are not directly associated with light control are utilized.

The high-voltage manager 304 includes a controller (manager CPU) 320 that is coupled to the luminaire 340, and to a smart sensor CPU 335 of the smart sensor system 302. As shown, the smart sensor CPU 345 is coupled to a communication interface 350, wherein the communication interface 350 couples the controller to an external device. The smart sensor system 302 additionally includes a sensor 340. As indicated, the sensor 340 can include one or more of a light sensor 341, a motion sensor 342, and temperature sensor 343, and camera 344 and/or an air quality sensor 345. It is to be understood that this is not an exhaustive list of sensors. That is additional or alternate sensors can be utilized for occupancy and motion detection of a structure that utilizes the lighting control fixture 300. The sensor 340 is coupled to the smart sensor CPU 345, and the sensor 340 generates a sensed input. For at least one embodiment, at least one of the sensors is utilized for communication with the user device.

For an embodiment, the temperature sensor 343 is utilized for occupancy detection. For an embodiment, the temperature sensor 343 is utilized to determine how much and/or how quickly the temperature in the room has increased since the start of, for example, a meeting of occupants. How much the temperate has increased and how quickly the temperature has increased can be correlated with the number of the occupants. All of this is dependent on the dimensions of the room and related to previous occupied periods. For at least some embodiment, estimates and/or knowledge of the number of occupants within a room are used to adjust the HVAC (heating, ventilation and air conditioning) of the room. For an embodiment, the temperature of the room is adjusted based on the estimated number of occupants in the room.

According to at least some embodiments, the controllers (manager CPU 320 and the smart sensor CPU) are operative to control a light output of the luminaire 340 based at least in part on the sensed input, and communicate at least one of state or sensed information to the external device.

For at least some embodiments, the high-voltage manager 304 receives the high-power voltage and generates power control for the luminaire 340, and generates a low-voltage supply for the smart sensor system 302. As suggested, the high-voltage manager 304 and the smart sensor system 302 interact to control a light output of the luminaire 340 based at least in part on the sensed input, and communicate at least one of state or sensed information to the external device. The high-voltage manager 304 and the smart sensor system 302 can also receive state or control information from the external device, which can influence the control of the light output of the luminaire 340. While the manager CPU 320 of the high-voltage manager 304 and the smart sensor CPU 345 of the smart sensor system 302 are shown as separate controllers, it is to be understood that for at least some embodiments the two separate controllers (CPUs) 320, 345 can be implemented as single controller or CPU.

For at least some embodiments, the communication interface 350 provides a wireless link to external devices (for example, the central controller, the user device and/or other lighting sub-systems or devices).

An embodiment of the high-voltage manager 304 of the lighting control fixture 300 further includes an energy meter (also referred to as a power monitoring unit), which receives the electrical power of the lighting control fixture 300. The energy meter measures and monitors the power being dissipated by the lighting control fixture 300. For at least some embodiments, the monitoring of the dissipated power provides for precise monitoring of the dissipated power. Therefore, if the manager CPU 320 receives a demand response (typically, a request from a power company that is received during periods of high power demands) from, for example, a power company, the manager CPU 320 can determine how well the lighting control fixture 300 is responding to the received demand response. Additionally, or alternatively, the manager CPU 320 can provide indications of how much energy (power) is being used, or saved.

Figure 4:
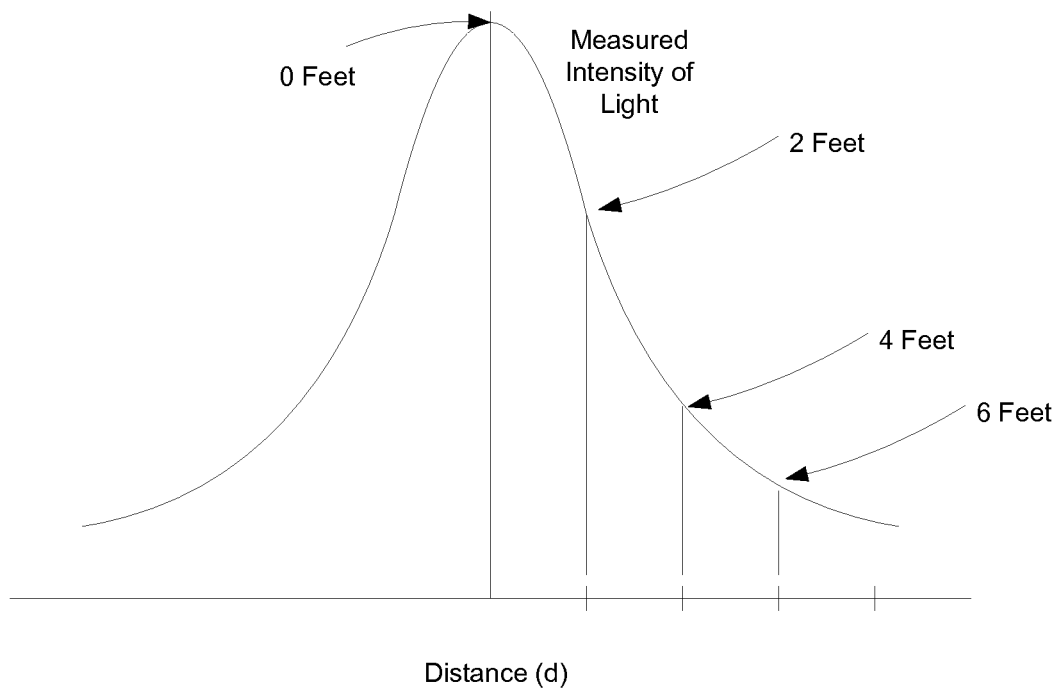
FIG. 4 shows variation of measured intensity of light with respect to distance from the source of the light, according to an embodiment.

FIG. 4 shows variation of measured intensity of light with respect to distance from the source of the light, according to an embodiment. The light intensity detection unit 220 generates a sensed signal that represents an intensity of received light. This sensed signal can be used for estimating a location of the sensor (and therefore, a fixture that includes the sensor). As stated, the curve shown in FIG. 4 provides a representation of the variation in received light intensity as a function of the distance the sensor receiving the light is from the source of the light. Utilizing this relationship, estimates of the distance between a light source and a sensor sensing the light source can be determined. For example, a light associated with a first fixture can be controllably activated. By knowing the level of intensity of light being emitted from the activated light, and the level of the intensity of light at the sensor of a second fixture, the distance between the activated light of the first fixture and the light sensor of the second fixture can be estimated. As will be described, for an embodiment, a light of a single fixture of an area is activated making it the only source of light in the area and the distances between the activated light of the single fixture and the other fixtures of the area can be estimated.

As shown, the intensity of light generated by a fixture (light fixture) diminishes with distance traveled by the light way from the Fixture Light. The light intensity at exemplary distances of 0 feet, 2 feet, 4 feet and 6 feet are depicted in FIG. 4. Based on knowledge of the relationship between received light intensity and distance as shown by the exemplary curve of FIG. 4, the distances between the light intensity sensor and the originating light can be estimated based on the sensed light intensity.

Figure 5:
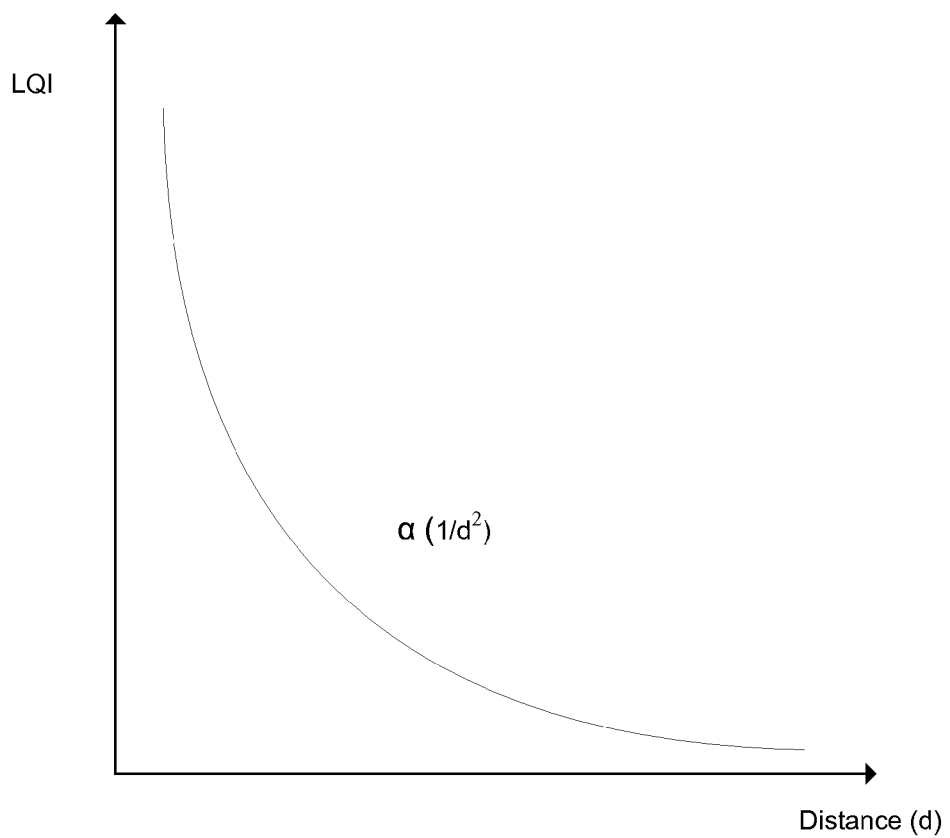
FIG. 5 shows variation of measured link quality indicator (LQI) with respect to distance from the source of an electromagnetic signal source, according to an embodiment.

FIG. 5 shows variation of measured link quality indicator (LQI) with respect to distance from the source of an electromagnetic signal source, according to an embodiment. As described, the LQI unit 230 of the fixtures includes an electromagnetic signal transmitter and an electromagnetic signal receiver. Utilizing a curve similar to the curve shown in FIG. 5, the distance between a first LQI unit of a first fixture and a second LQI unit of the second fixture can be estimated. That is, by transmitting an electromagnetic signal from the first fixture at a known power level, the distance between the first LQI sensor and the second LQI sensor can be estimated based on the power level of the sensed electromagnetic signal received by the second LQI.

As shown in the FIG. 5, LQI decreases with square of distance. Based on this observation of LQI between two LQI sensors (fixtures), the relative distance between fixtures in the network of fixtures can be determined.

Figure 6:
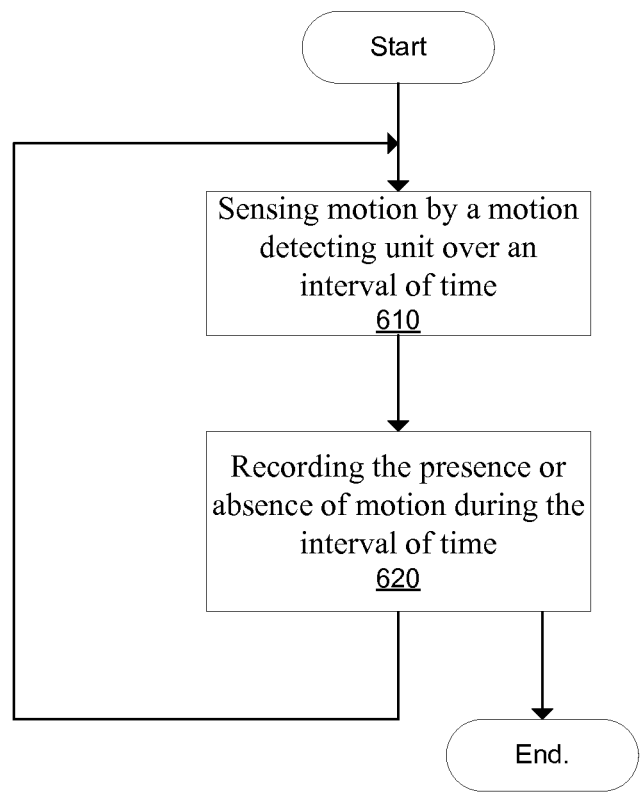
FIG. 6 is a flow chart that includes steps of operation of a motion sensor, according to an embodiment.

FIG. 6 is a flow chart that includes steps of operation of a motion sensor, according to an embodiment. Rather than estimating signal levels as the light intensity detection unit 220 and the LQI unit 230 do, the motion detecting units 210 of multiple fixtures can associate commonly located fixtures by correlating motion sensed by the commonly located fixtures. That is, when the timing of sensed motion of multiple fixtures is the same, it is assumed that the multiple fixtures are proximately located. The more times the sensed motion of motion detecting units 210 of the multiple fixtures are correlated in time, the higher the level of confidence that the multiple fixtures are located near each other.

As shown, a first step 610 includes sensing motion by a motion detecting unit 210 over an interval of time. That is, sensed motion is monitored and observed over a fixed interval of time.

Further, a second step 620 includes recording the presence or absence of motion during the interval of time. The recorded presence of motion during the interval of time for multiple motion detecting units can be used to determine common locations of the fixtures of the motion detecting units.

Once the motion observation process is started, it observes (senses motion) of the area associated with the fixtures, for a fixed interval of time, for example, 5 seconds and then record the presence or absence of motion. This recorded information is sent to central controller at fixed interval of, for example, 5 minutes, for processing. The process continues until stopped.

FIG. 7 show samples of data generated by a plurality of motion sensor units, according to an embodiment. The data shown in FIG. 7 is raw data generated by multiple motion sensor units of multiple fixtures. The table of data of FIG. 7 includes the motion sensor unit number (1-5), a time stamp of the senses motion, and the raw sensed motion data. As previously stated, commonly located sensors and fixtures can be identified by correlating the sensed motion of the multiple fixtures.

For an embodiment, the data of the motion detecting unit is sent to the central controller once every time period (for example, every 5 minutes) and sampled at a sampling interval (such as, every 5 seconds). As shown, the LCS_ID represents identification identifier of sensor (fixtures), TIMESTAMP represents time at which 5 minute window ends and MOTION_DETECTED represents the 60 binary motion bits with 1 representing motion detected and 0 representing motion not detected.

Figure 8:
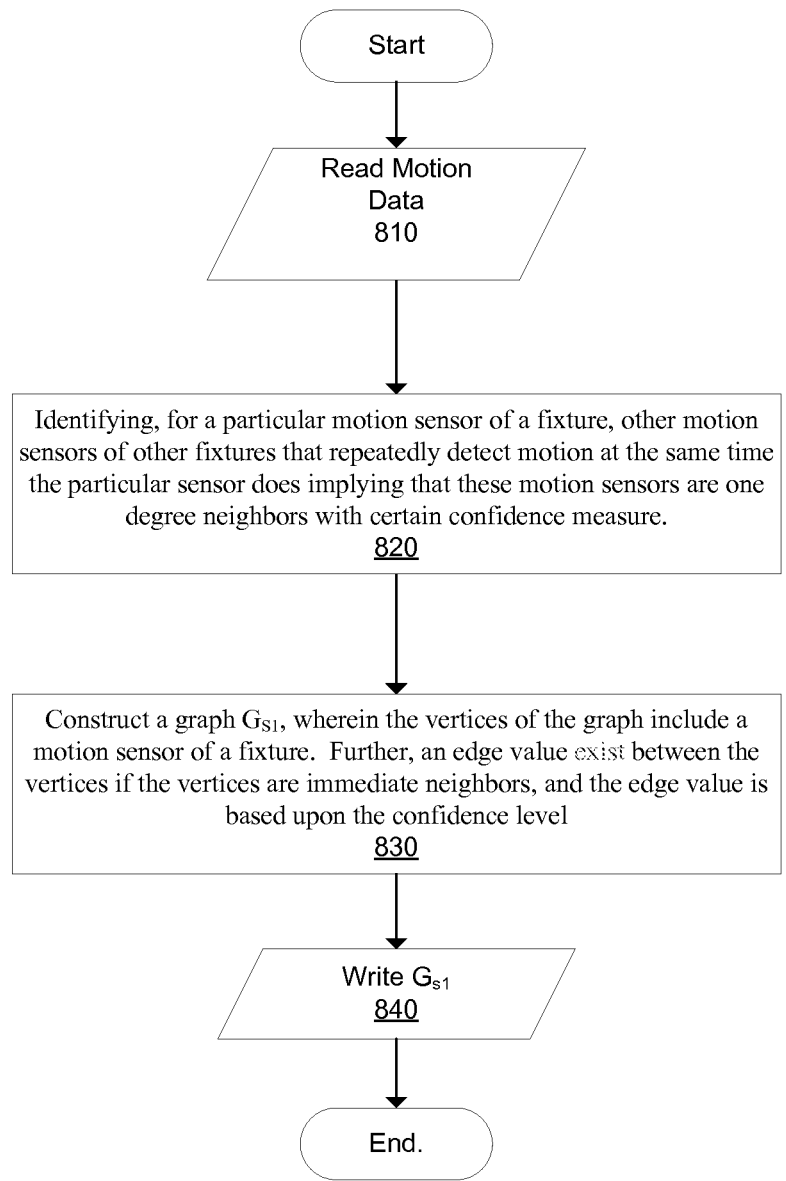
FIG. 8 shows steps of a method of constructing a graph $G_{S1}$ from data generated by a motion sensor unit, according to an embodiment.

FIG. 8 shows steps of a method of constructing a graph $G_{S1}$ from data generated by a motion sensor unit, according to an embodiment. A first step 810 includes a controller retrieving the sensing motion data from memory.

A second step 820 includes identifying, for a particular motion sensor of a fixture, other motion sensors of other fixtures that repeatedly detect motion at the same time the particular sensor does. The other fixtures are identified as immediate neighboring fixtures. A confidence level is determined based how closely the motion of the other fixtures is correlated to motion sensed by the particular motion sensor, and the number of repeating times the motion is correlated.

A third step 830 includes constructing a graph $G_{S1}$, wherein the vertices of the graph include a motion sensor of a fixture. Further, an edge value between the vertices if the vertices are immediate neighbors, and the edge value is based upon the confidence level.

Once the graph $G_{S1}$ has been constructed, the graph $G_{S1}$ can be written to memory (step 830).

The process of FIG. 8 provides an exemplary method of algorithmically processing the motion data. The key observation in analysis of motion data is that if two sensors are detecting motion at same instant of time (for example, at the sampling interval of 5 seconds) or in a next interval then the sensors are spatially close with high probability. It could happen that two sensors are distant but detect motion in same interval because 2 different people are walking below that sensor in the same instant of time. But the probability of latter case happening is much smaller as compared to that of former one. So observing data over period of time and for a given sensor, finding all other sensors such that, they detect motions at the same time, repeatedly, then such sensors are immediate neighbored, with certain confidence measure, where the confidence measure is a value between 0 and 1, and is directly proportional to number of times the two sensors detect motion at the same time.

Figure 9:
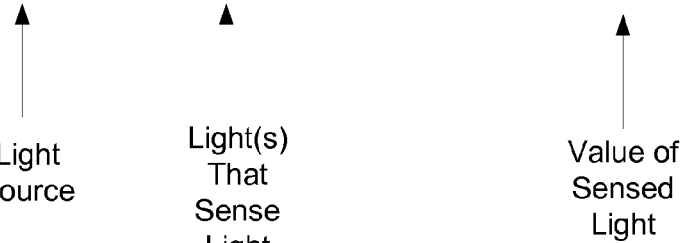
FIG. 9 shows an example of data generated by a light intensity sensor unit, according to an embodiment.

FIG. 9 shows an example of data generated by a light intensity sensor unit, according to an embodiment. More specifically, FIG. 9 includes a table that indicates the fixture of the activated light (light source), the fixture that senses the light, and the value of the sensed light. Based on this table, neighboring fixtures can be identified.

The light intensity detection unit can be used to construct $G_{S2}$, a graph similar to Graph $G_{s1}$. Consider a setup wherein first all light from sources, such as, Sunlight and so on, other than Fixture Light present on the floor plan is blocked. Second, only one light fixture (source) is switches on, and all other sensors (Destinations) present on the floor plan detect light intensity using the light intensity detection unit. This process is then repeated for all sensors (fixtures) of the floor plan. FIG. 8 is an exemplary embodiment of data generated by this setup. LCS_ID_SRC represent the sensor which is acting like a source and LCS_ID_DEST are the destination sensors. The column LIGHT_INTENSITY_DETECTED column represents the light detected by LCS_ID_DEST. Referring to FIG. 4, it can be deduced that for a given LCS_ID_SRC, all the LCS_ID_DEST detecting max light of intensity are immediate neighbored, with a measure of confidence. This is true even if the light intensity detection unit is directional. That is, the light intensity detected depends on the orientation of sensor.

Figure 10:
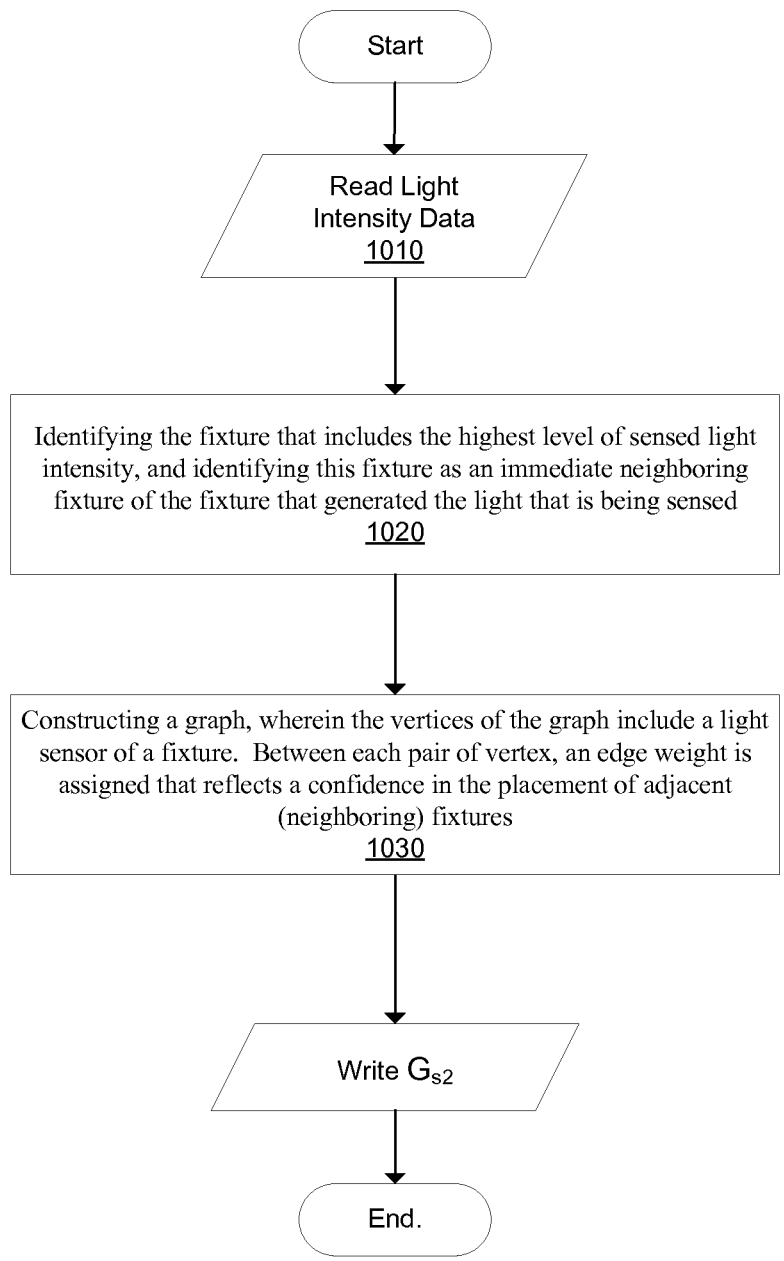
FIG. 10 shows steps of a method of constructing a graph $G_{S2}$ from data generated by a light intensity sensor unit, according to an embodiment.

FIG. 10 shows steps of a method of constructing a graph $G_{S2}$ from data generated by a light intensity sensor unit, according to an embodiment. A first step 1010 includes a controller retrieving the sensing light intensity data from memory. For this embodiment, the light data is generated while controllably activating a single light associated with a fixture within an area. Other fixtures within the area receive the light, and sense an intensity of the received light. The retrieved sensed light intensity is processed to identify the fixture that includes the highest level of sensed light intensity. A second step 1020 includes identifying the fixture that includes the highest level of sensed light intensity, and identifying this fixture as an immediate neighboring fixture of the fixture that generated the light that is being sensed.

A process can be initiated wherein a different one of the fixtures activates its light, and the sensed light intensity at all of the other of the fixtures is monitored. Through an iterative process, neighboring fixtures can be identified. A third step 1030 includes constructing a graph $G_{S2}$, wherein the vertices of the graph include a light sensor of a fixture. Between each vertex, an edge weight is assigned that reflects a confidence in the placement of adjacent (neighboring) fixtures. For an embodiment, the confidence level is dependent on the relative value of the sensed light intensity. The greater the sensed value, the greater the confidence level. Once the graph $G_{S2}$ has been constructed, the graph $G_{S2}$ can be written to memory (step 1030). The process of FIG. 10 provides an exemplary embodiment of algorithmically processing the light intensity data. The flow chart provides for construction of $G_{S2}$ from the light intensity data.

LQI units can be used to construct $G_{s3}$ graph similar to Graph $G_{s2}$. Referring to FIG. 5, it can be concluded that a very high value of LQI between two fixtures implies that the fixtures are one degree close with high measure of confidence, irrespective of the noise factors involved in LQI readings. LQI unit can compute the LQI between two fixtures, compute LQI readings for all possible pairs of sensors (fixtures).

FIG. 11 shows an example of data generated by an LQI sensor unit, according to an embodiment. More specifically, the table includes a designation of the fixture that generates the electromagnetic signal, and then the fixtures that sense the electromagnetic signal, and a sensed LQI (Link Quality Indicator) of the received signal. The LQI of the fixture that receives electromagnetic signal having the greatest LQI is the fixture that has the best quality electromagnetic link. Typically, the fixture have the best electromagnetic link with the electromagnetic source, is the fixture that is closest to the fixture that generates the electromagnetic signal.

Figure 12:
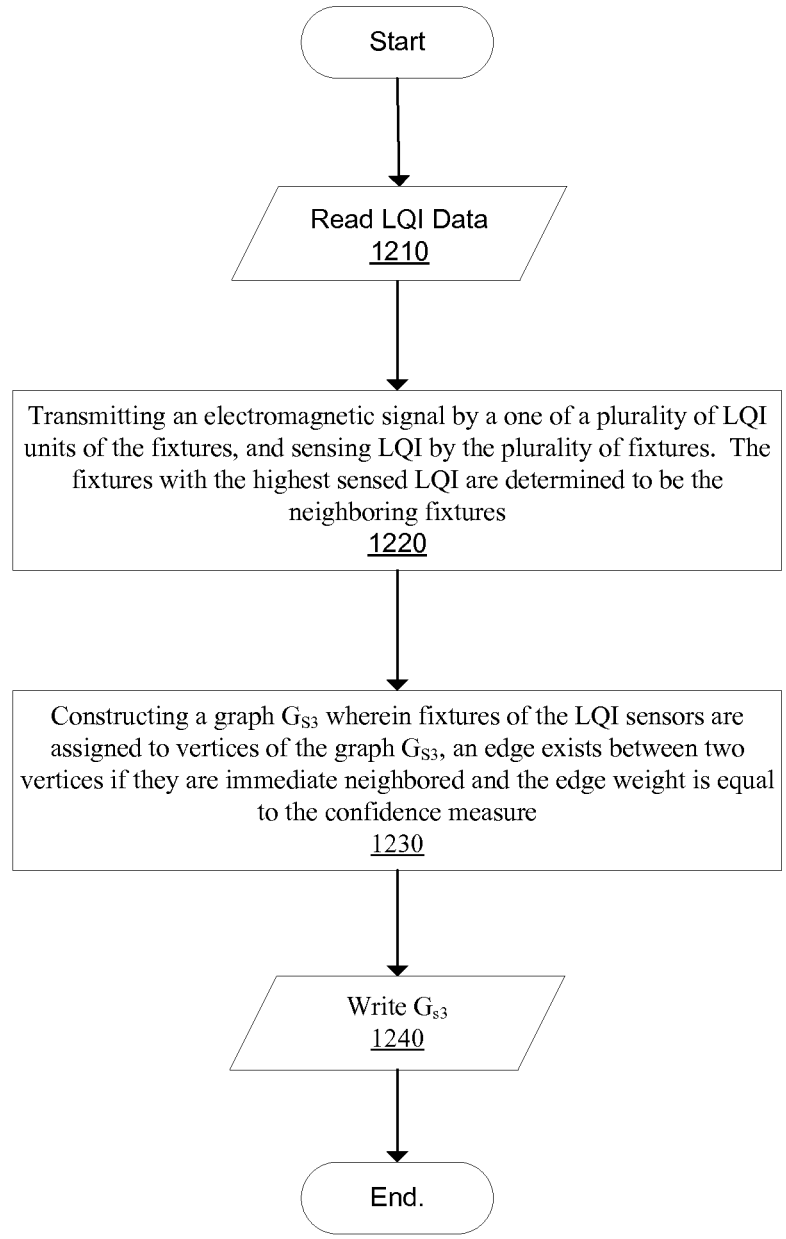
FIG. 12 shows steps of a method of constructing a graph $G_{S3}$ from data generated by an LQI sensor unit, according to an embodiment.

FIG. 12 shows steps of a method of constructing a graph $G_{S3}$ from data generated by an LQI sensor unit, according to an embodiment. A first step 1210 includes retrieving the sensed LQI data from memory. A second step 1220 includes transmitting an electromagnetic signal by a one of a plurality of LQI units of the fixtures, and sensing LQI by the plurality of fixtures. The fixtures with the highest sensed LQI are determined to be the neighboring fixtures. A level of confidence is determined by the value of the sensed LQI. The neighboring fixture having the largest LQI is assumed to be the fixture that is closest to the fixture that transmits the electromagnetic signal.

A third step 1230 includes constructing a graph $G_{S3}$ wherein fixtures of the LQI sensors are assigned to vertices of the graph $G_{S3}$, an edge exists between two vertices if they are immediate neighbored and the edge weight is equal to the confidence measure.

Once the graph $G_{S3}$ has been constructed, the graph $G_{S3}$ can be written to memory (step 1240).

For at least some embodiments, and Automated Commissioning System and/or method involves construction of a weighted graph (sensor graph) that includes nodes, wherein each node represent LCS (lighting control sensor, which can include a sensor and/or a lighting fixture) and weights on the edges between the nodes that represent a measure of distance between nodes ($G_s$). For at least some embodiments, the weighted graph is computed by algorithmically processing the sensing data sent by LCS's. Further, a Graph $G_s$ is computed by synthesizing the 3 Distance Graphs $G_{s1}$, $G_{s2}$, $G_{s3}$ generated from the data sent by Motion Detecting Unit, Light Intensity Detecting Unit and LQI unit, respectively.

The commission is completed through inexactly matching of the graph $G_s$ (sensor graph) with a floor plan graph ($G_f$).

Figure 13:
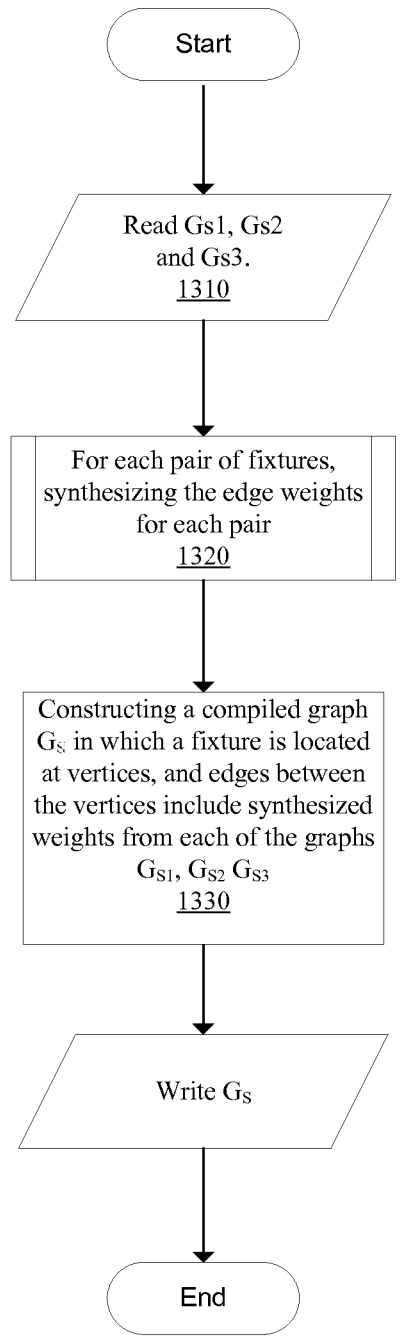
FIG. 13 is a flow chart that include steps of a method of constructing a compiled graph $G_S$ from the graphs $G_{S1}$, $G_{S2}$ $G_{S3}$, according to an embodiment.

FIG. 13 is a flow chart that include steps of a method of constructing a compiled graph $G_S$ from the graphs $G_{S1}$, $G_{S2}$ $G_{S3}$, according to an embodiment. A first step 1310 includes retrieving the graphs $G_{S1}$, $G_{S2}$ $G_{S3}$ from memory. A second step 1320 includes for each pair of fixtures, synthesizing the edge weights. As previously stated, the edge weights reflect a level of confidence in the pair being neighboring fixtures.

A third step 1330 includes constructing a compiled graph $G_S$ in which a fixture is located at vertices, and edges between the vertices include synthesized weights from each of the graphs $G_{S1}$, $G_{S2}$ $G_{S3}$.

Once the compiled graph $G_S$ has been constructed, the compiled graph $G_S$ can be written to memory (step 1340).

Figure 14:
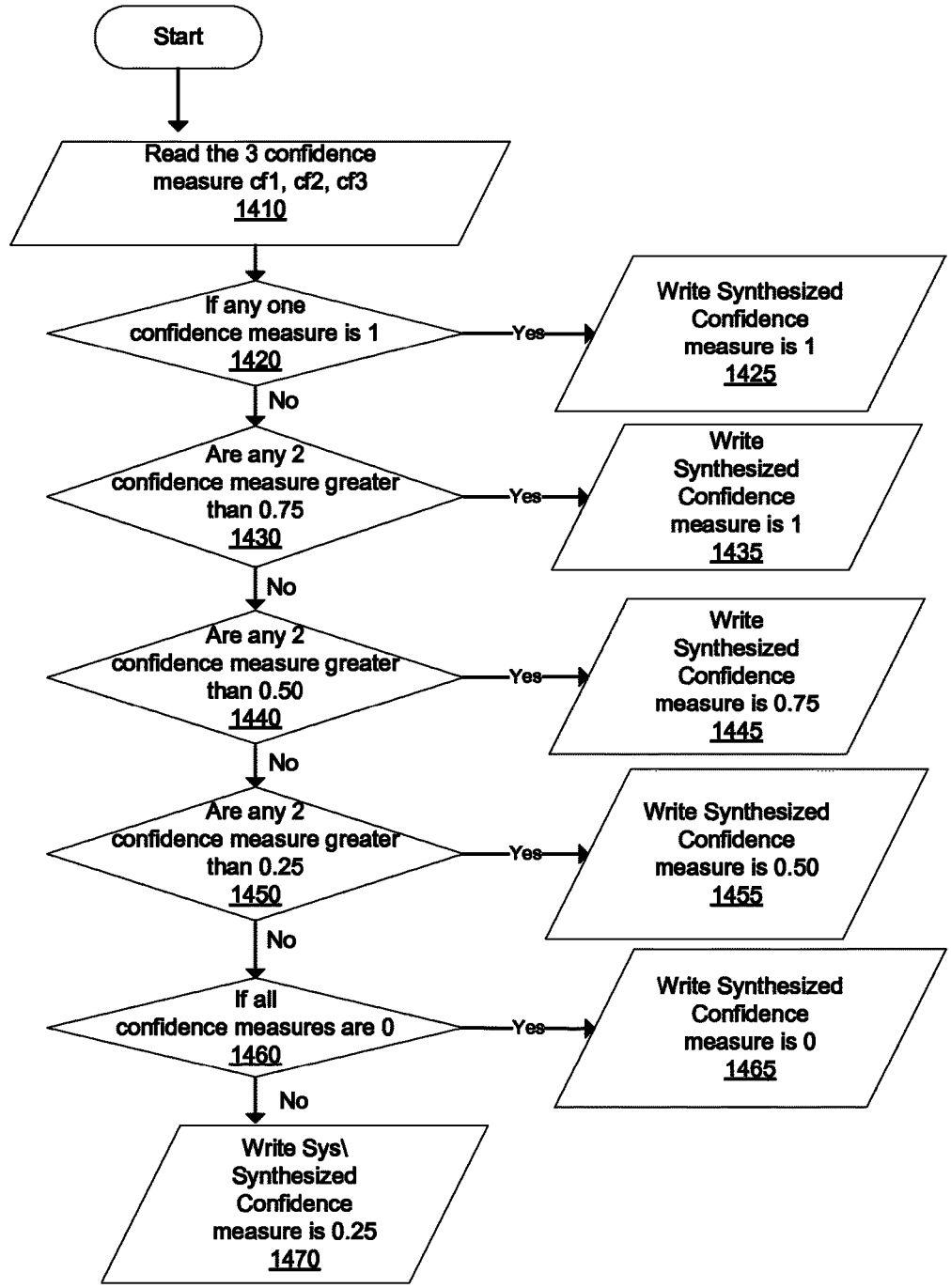
FIG. 14 is a flow chart that includes steps of a method of constructing the compiled graph $G_S$ using a synthesis function, according to an embodiment.

FIG. 14 is a flow chart that includes steps of a method of constructing the compiled graph $G_S$ using a synthesis function, according to an embodiment. As previously described, multiple sensor graphs $G_{S1}$, $G_{S2}$ $G_{S3}$ are generated based on the sensed signals. The generated graphs include nodes or vertices that represent the locations of the sensors, edges that include an estimated distance between the vertices, and a confidence value that represents a level of confidence in the accuracy of the estimated distance.

For an embodiment, the synthesized graph $G_S$ is generated by according to the steps of the flow chart of FIG. 14. A first step 1410 includes reading the confidence levels of the plurality of sensor graphs at a particular vertex or node, such as, from sensor graphs $G_{S1}$, $G_{S2}$ $G_{S3}$-A second step 1420 includes determining of any of the confidence levels are equal to 1. If yes, then the distance associated with the confidence level of 1 is used, and the confidence level of the synthesized distance estimate is set to 1 as well (step 1425). A third step 1430 includes determining if any of 2 confidence levels are greater than 0.75. If yes, then the synthesized confidence level is set to 1 (step 1435). A fourth step 1440 includes determining if any 2 confidence levels are greater than 0.50. If yes, then the synthesized confidence level is set to 0.75 (step 1445). A fifth step 1450 includes determining if any 2 confidence levels are greater than 0.25. If yes, then the synthesized confidence level is set to 0.50 (step 1455). A sixth step 1460 includes determining that all the confidence levels are 0. If yes, then the synthesized confidence level is set to 0 (step 1465). If all the confidence levels of step 1460 are not determined to be 0, then the synthesized confidence level is set to 0.25 (step 1470).

Figure 15:
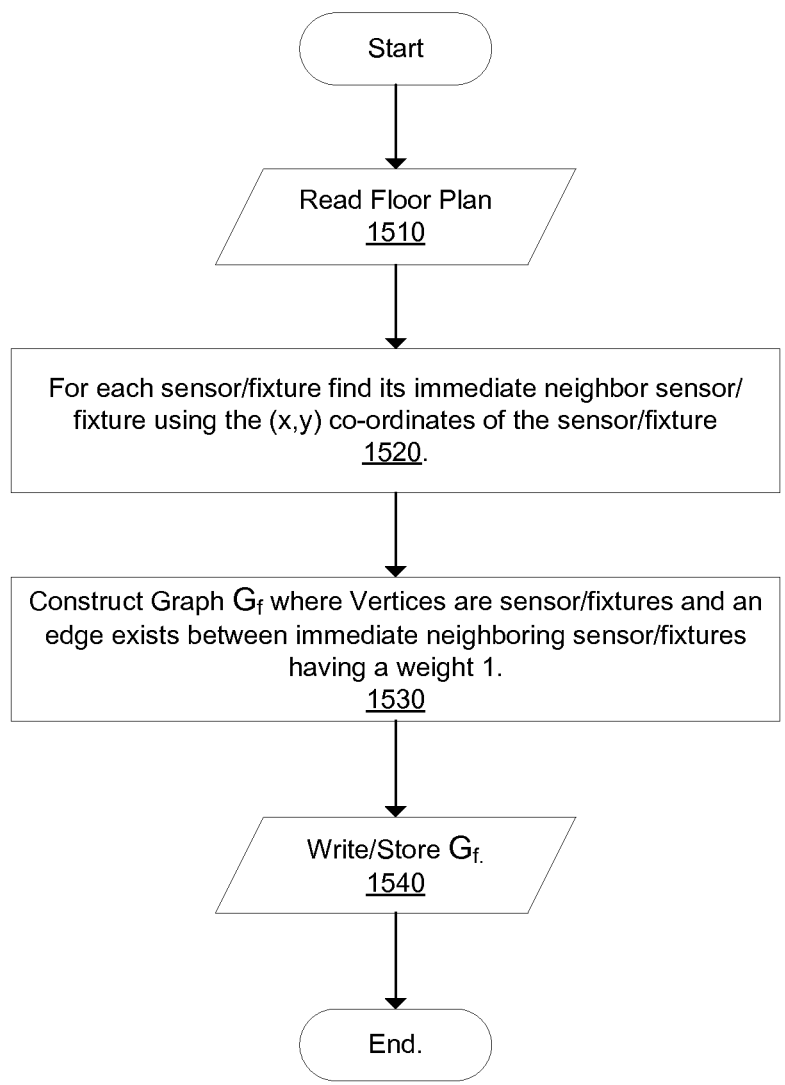
FIG. 15 is a flow chart that includes steps of a method of constructing a floor plan graph $G_f$ according to an embodiment.

FIG. 15 is a flow chart that includes steps of a method of constructing a floor plan graph $G_f$, according to an embodiment. A first step 1510 includes reading a floor plan of the area. For an embodiment, the floor plan is an existing plan that includes the exact location of all the sensor/fixtures within an area. However, the floor plan does not include information of which sensor/fixture is in each location, just that a fixture/sensor is in the precise location(s). A second step 1520 includes for each sensor/fixture, determining its immediate neighbor sensor/fixture using the (x,y) co-ordinates of the sensor/fixture. With this information, a third step 1530 includes constructing a floor plan graph $G_f$ where vertices of the graph represent sensor/fixtures and an edge exists between immediate neighboring sensor/fixtures having a weight 1. That is, the exact location of each sensor/fixture can be determined from the floor plan, and a weight (confidence level) of one can be assigned for the distance between because the exact distances between each vertex (sensor/fixture location) is know from the floor plan. A fourth step 1540 includes writing/storing the floor plan graph.

Matching of Sensor Graph with Floor Plan Graph

Once a representation of a sensor graph (synthesized or not, and including any number of sensor types) has been determined or obtained, and a floor plan graph that represents the actual locations of sensors (and/or light fixtures that include the sensors) has been obtained, the commissioning of the sensors/fixtures includes matching the sensor graphs with the floor plan graph for determining which sensors are at which sensor location of the floor plan graph. This process provides a method of identifying which sensor/fixture is located at which sensor location.

For at least some embodiments, the floor plan graph includes exact locations of the sensors within the structure, and matching includes placing each of the sensors based on the exact location of the sensors of the floor plan graph and information about the sensors of the sensor graph, wherein the information comprises the vertices and estimated distances between the vertices of the sensor graph. For at least some embodiments, the first-degree neighbors of the vertices of the floor plan graph are known, the first-degree neighbors of the vertices of the sensor graph is estimated based on sensed signals of the sensor, and both the floor plan graph and the sensor graph include a same number of vertices. For an embodiment, sensor graph and the floor plan graph are planar with bounded degree.

For at least some embodiment, the inexact graph matching is performed by using customized branch and bound method optimized with respect to time and accuracy. The branch and bound (BB or B&B) is a general algorithm for finding optimal solutions of various optimization problems, especially in discrete and combinatorial optimization. A branch-and-bound algorithm consists of a systematic enumeration of all candidate solutions, where large subsets of fruitless candidates are discarded en masse, by using upper and lower estimated bounds of the quantity being optimized.

For at least some embodiments, vertices of the sensor graph are matched with vertices of the floor plan graph that include a similar edge structure. For at least some embodiments, an edge structure is determined based on a number of first degree neighboring vertices, and the similar edge structure is determined as vertices having a same number of first degree neighboring vertices.

At least some embodiments include identifying vertices of the floor plan graph that include unique characteristics, and matching vertices of the sensor graph that includes the unique characteristics. The unique characteristics include, for example, a unique number of first degree neighbor nodes, and/or unique number of edges.

At least some embodiments include first matching vertices of the sensor graph that include confidence levels above a threshold, and subsequently matching vertices of the sensor graph that include confidence levels below the threshold. For an embodiment, a measure of the confidence level of the vertex is a sum of the confidence levels of edges incident on that vertex.

At least some embodiments include identifying the vertices of the sensor graph that include the highest quality information about neighbors and confidence levels in the edge distances. Best matches identified and performed first, next lower quality matched performed next.

For at least some embodiments, the matching includes selecting a vertex of the floor plan graph to match a vertex of the sensor graph, wherein the degrees of the vertex of the floor plan graph and the degrees the vertex of the sensor graph are a maximum, and a difference between the degrees of the vertex of the floor plan graph and the vertex of the sensor graph are a minimum, and the vertex of the floor plan graph and the vertex of the sensor graph have not been previously matched, wherein the degrees reflects a number of neighboring vertices. That is, a vertex $V_{f1}$ is selected from the floor plan graph and a vertex $V_{s1}$ is selected from the sensor graph such that degrees of $V_{f1}$ and $V_{s1}$ are maximum, difference in degree of $V_{f1}$ and $V_{s1}$ is minimum and $V_{f1}$ and $V_{s1}$ have not been picked earlier. Next a determination is made regarding how good the match is between one degree neighbor of $V_{f1}$ and $V_{s1}$ and if it's good enough then continue with the best neighboring vertex else start afresh and go back to the previous step. If good match is found then output it or if too much time is consumed then output the best match found to date.

At least some embodiments include scoring a quality of the matching based on at least one of a difference in a cardinality of an edge set of the floor plan graph and the sensor graph, cardinality of a vertex set of the floor plan graph and the sensor graph, and/or a measure of a dissimilarity in an edge structure of the floor plan graph and the sensor graph after the match. For an embodiment, an error or quality estimate of the matching includes difference in the match score and ideal match score. The difference in number of edges between the floor plan graph and sensor graph gives a measure of the ideal match score.

Figure 17:
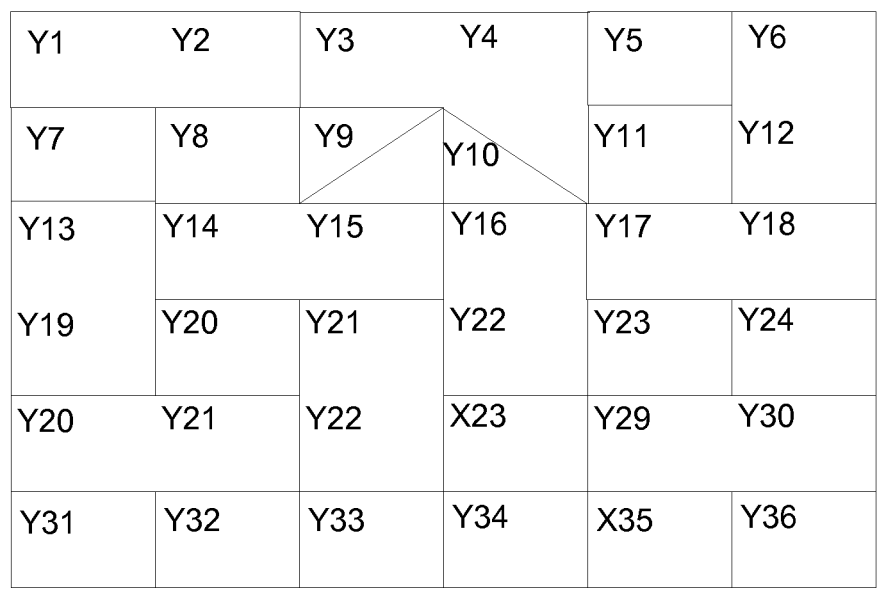
FIG. 17 shows a sensor graph according to an embodiment.

FIG. 16 a floor plan graph according to an embodiment, and FIG. 17 shows a sensor graph according to an embodiment. As previously described, the vertices of the graphs represent sensor locations. The following are exemplary steps for matching Graphs G1 (Floor Plan Graph) and G2 (Sensor Graph). The graph matching process involves mapping all Vertices from one graph to another such that a maximum number of edges are matched and there is minimum number of mismatch between edges.

A first step (a) includes picking a Vertex from each graph such that they are similar and are have a maximum degree. A measure of similarity can be degree of Vertex. For example in Graph1 and Graph2 there are many pairs of vertices which satisfy above criteria of selection. Vertex pair (X16, Y16) is one such pair, (X10, Y16) is another, (X10, Y10) is another but not (X22, Y22).

A second step (b) includes assigning a cost to each Vertex match as sum of dissimilarity between Vertex. A measure of dissimilarity can be sum of difference in degree of matched Vertex and Match score of 1-degree neighboring graphs of matched Vertex. For example if Vertex Pair (X16 and Y16) are matched then the cost of Matching=(|degree of (X16)−degree (Y16)|+MatchScoreOf 1-degreeNeighbourerGraphs of (X16,Y16)). The cost of Matching Vertex (X16,Y16) would be (0+(0+1+1+2))=4 and 1-degree neighboring vertices matched would be ((X10,Y10), (X15,Y15), (X17, Y17), (X22,Y22)). Note: MatchScoreOf 1-degreeNeighbourerGraphs of (X16,Y16)) is calculated by using step "c" defined below.

A third step (c) includes computing a MatchScoreOf 1-degreeNeighbourerGraphs by executing following steps:
  1. To start the match, pick up Vertex from each graph such that they are similar and are have a maximum degree. For an embodiment, a measure of similarity is a degree of the Vertex. For example if (X16, Y16) were matched then 1-degreeNeighbourerGraphs that are being matched are G1=(Vertices1=(X10, X15,X17,X22), Edges1=((X10,X15), (X10, X17), (X15, X22), (X17, X22))) and G2=(Vertices2=(Y10, Y15,Y17,Y22), Edges2=((Y10,Y15), (Y10,Y17))) and as per the condition described above match vertices (X10, Y10);
  2. Assign cost to Vertex match as sum of dissimilarity between Vertex. A measure of dissimilarity can be difference in degree of matched vertices. For example if Vertex Pair (X10,Y10) are matched then the cost of Matching=(|degree of (X10)−degree (Y10)|)=(2−2)=0;
  3. Next match the vertex pair which are similar and have maximum degree. A measure of similarity can be degree of Vertex. For example:—After (X10, Y10) are matched one can match (X15, Y15) and the cost of this match would be (1−0)=1;
  4. MatchScore would be sum of cost of matches until now=(0+1)=1;
  5. When there are no more vertices to be matched then the matching process stops and the MatchScoreOf 1-degreeNeighbourerGraphs is sum of cost of matched vertices;
  6. If MatchScore is low enough value then it is acceptable Match. For example if |MatchScore−||cardinality(Vertices1)−cardinality(Vertices2)|+|cardinality(Edges1)−cardinality(Edges1)|||<=√min(cardinality(Vertices1), cardinality(Vertices2)) then it can be considered as low matchscore and matching process stops.
  7. If Match is not good then one goes back to step "a" and restart the match process, until a match with acceptable low score is found.

A fourth step (d) includes picking up that vertex matched pair whose degree is maximum and the difference in degree in minimum from 1-degree neighboring vertices matched set. For example while matching (X16,Y16) the 1-degree neighboring vertices matched set was ((X10,Y10), (X15, Y15), (X17,Y17), (X22,Y22)) and vertex pair (X10,Y10) satisfy the condition of maximum degree and minimum degree difference, so the next vertex pair which is matched is (X10,Y10).

A fifth step (e) includes using step (b) to determine the cost of matching the new vertex pair found in step (d).

A sixth step (f) includes repeating step (d) in finding the next pair of vertex match.

A seventh step (g) includes repeating steps (b) to (d) until all vertices are matched.

An eighth step (h) includes determining a cost of the Graph match which is the sum of cost of matching vertices.

A ninth step (i) includes determining if |(cost of Graph match−Difference in the cardinality of edges of two Graphs) |<=√(cardinality(Vertices of Graph)) then it's an acceptable match else restart the matching process by going to step "a".

Figure 18:
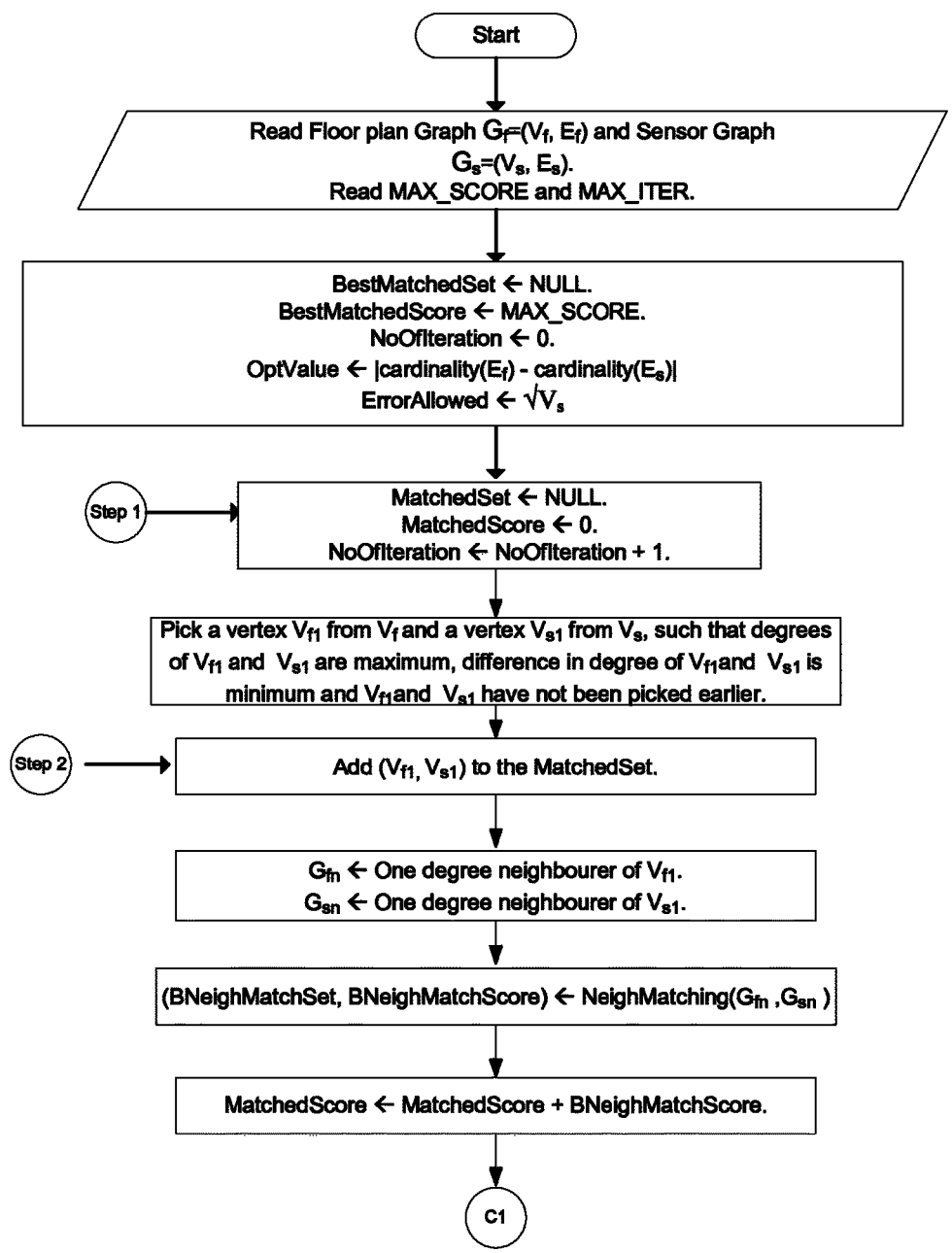
FIGS. 18, 19, 20 show steps of methods for analyzing and matching two un-weighted graphs with a maximum run time, and outputting a best match found between the two graphs and a score of the best match, according to at least some embodiments.
Figure 19:
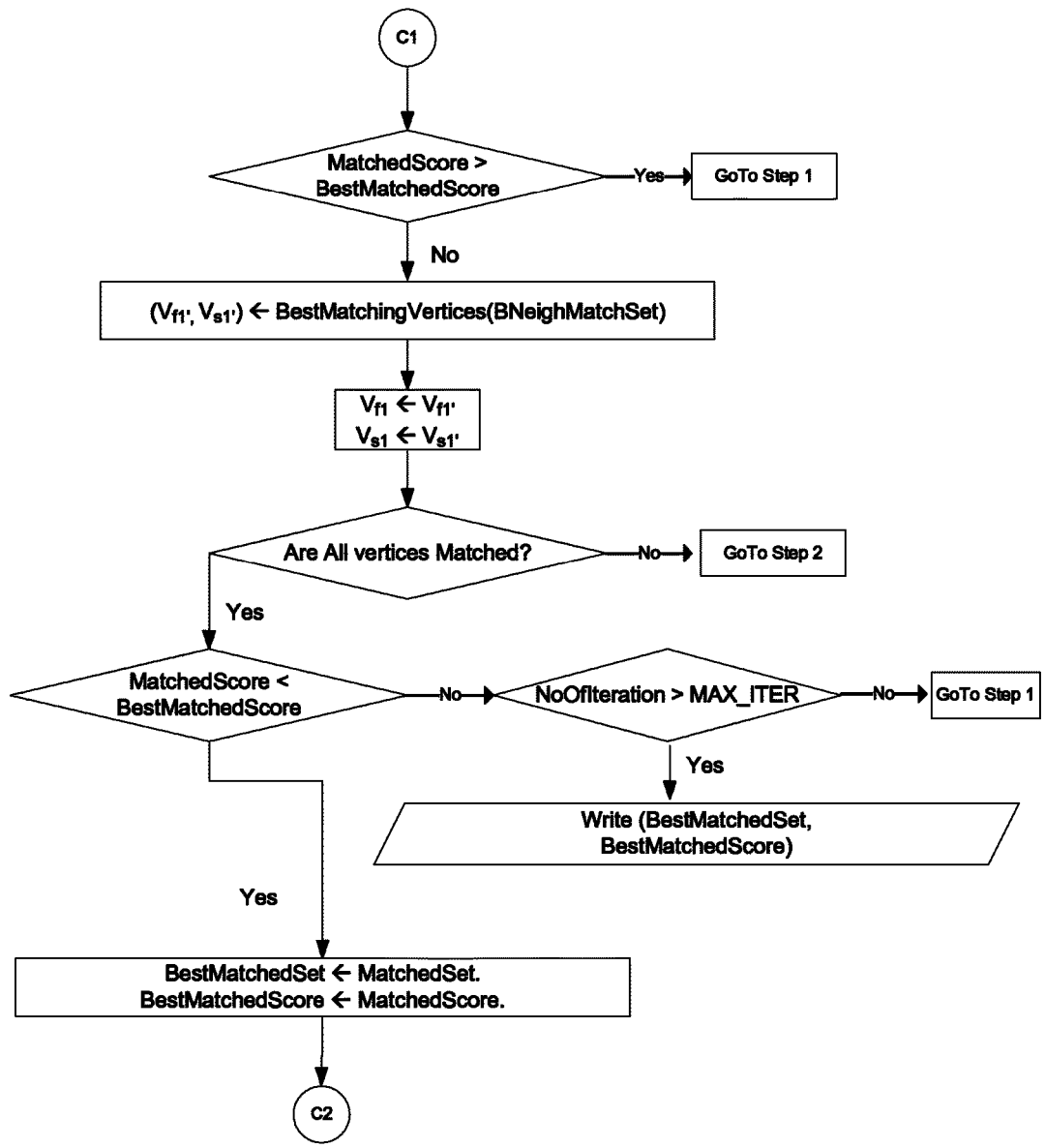
Figure 20:
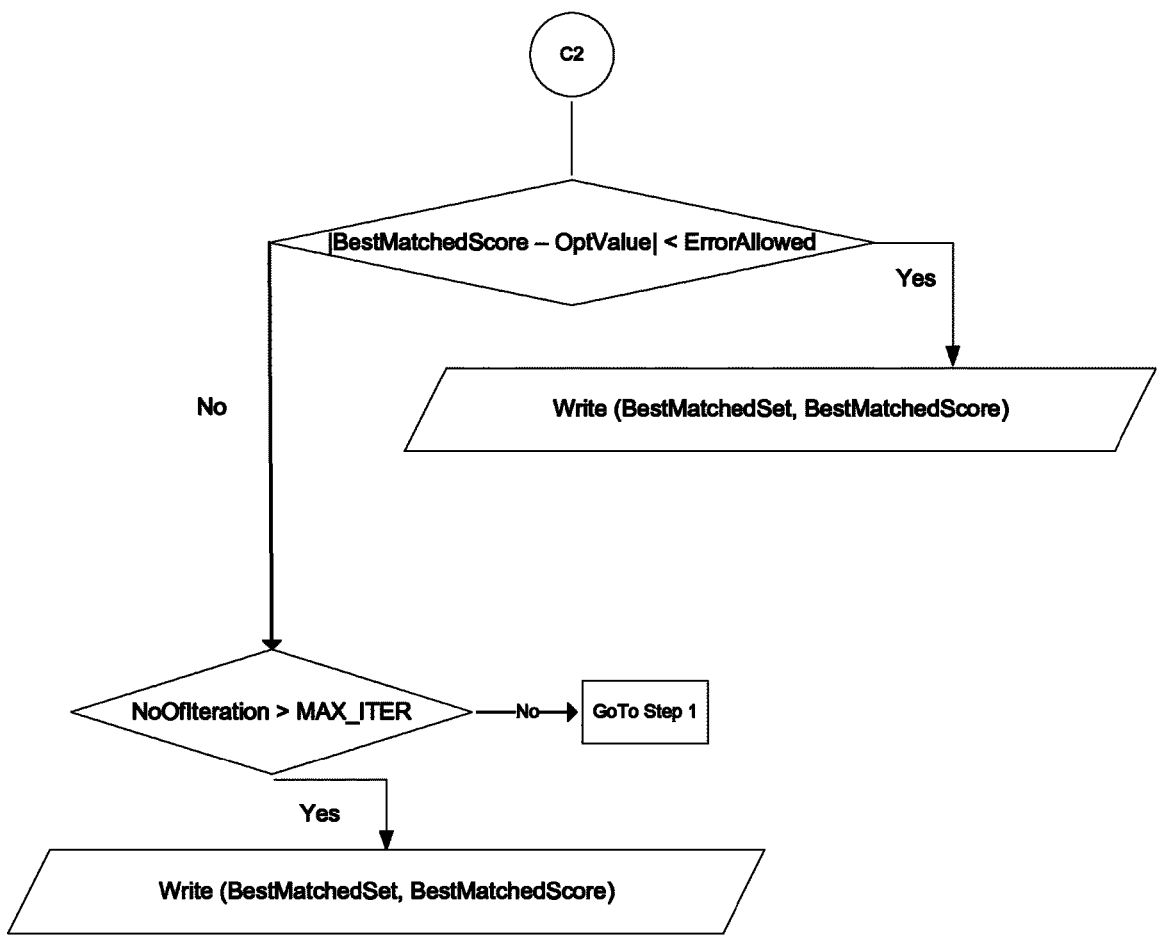

FIGS. 18, 19, 20 show steps of methods for analyzing and matching two un-weighted graphs with a maximum run time, and outputting a best match found between the two graphs and a score of the best match, according to at least some embodiments.

Figure 21:
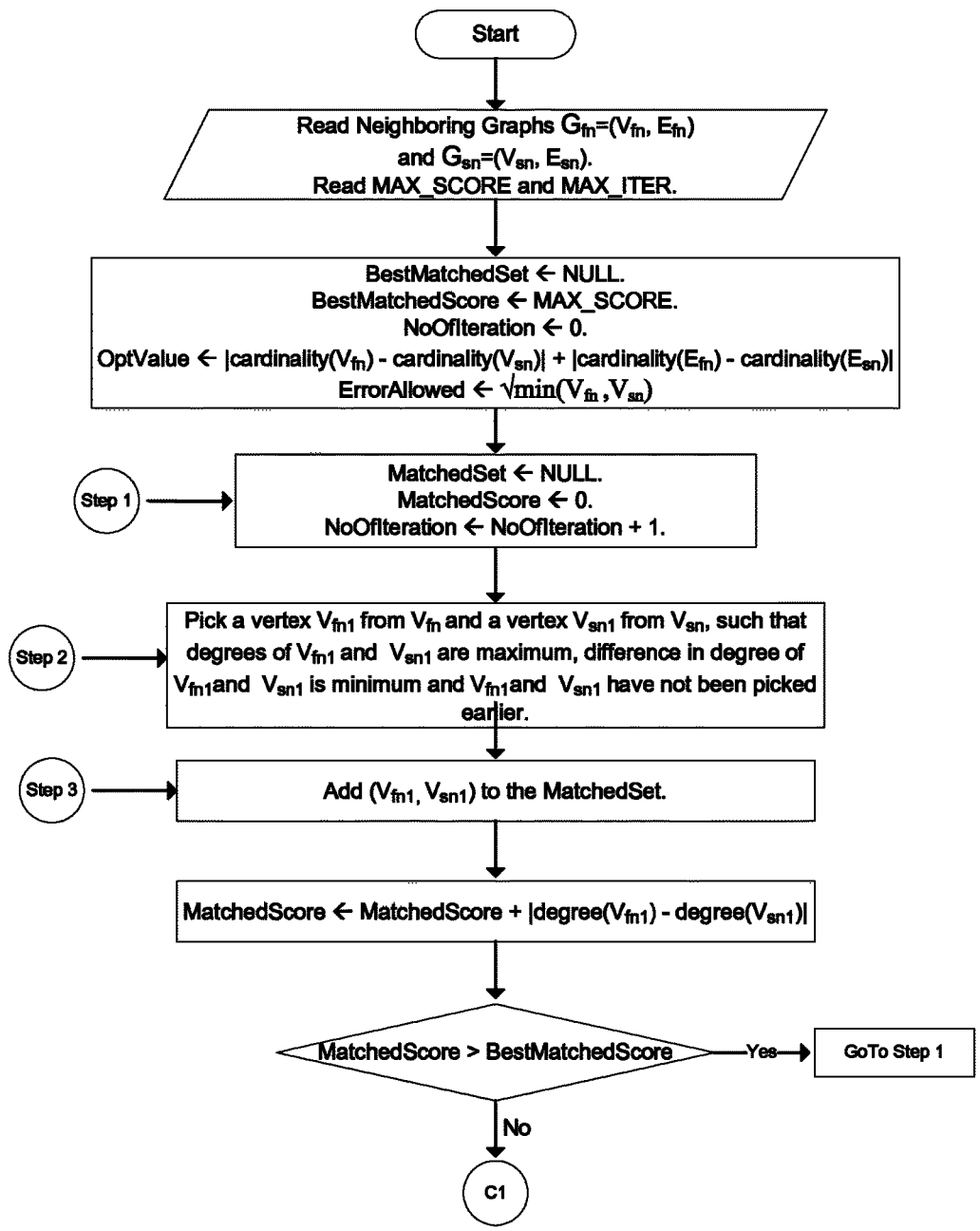
FIGS. 21, 22, 23 show steps of methods for finding a match between two one-degree neighboring graphs with a maximum run time, and outputting a score of the best match, according to at least some embodiments.
Figure 22:
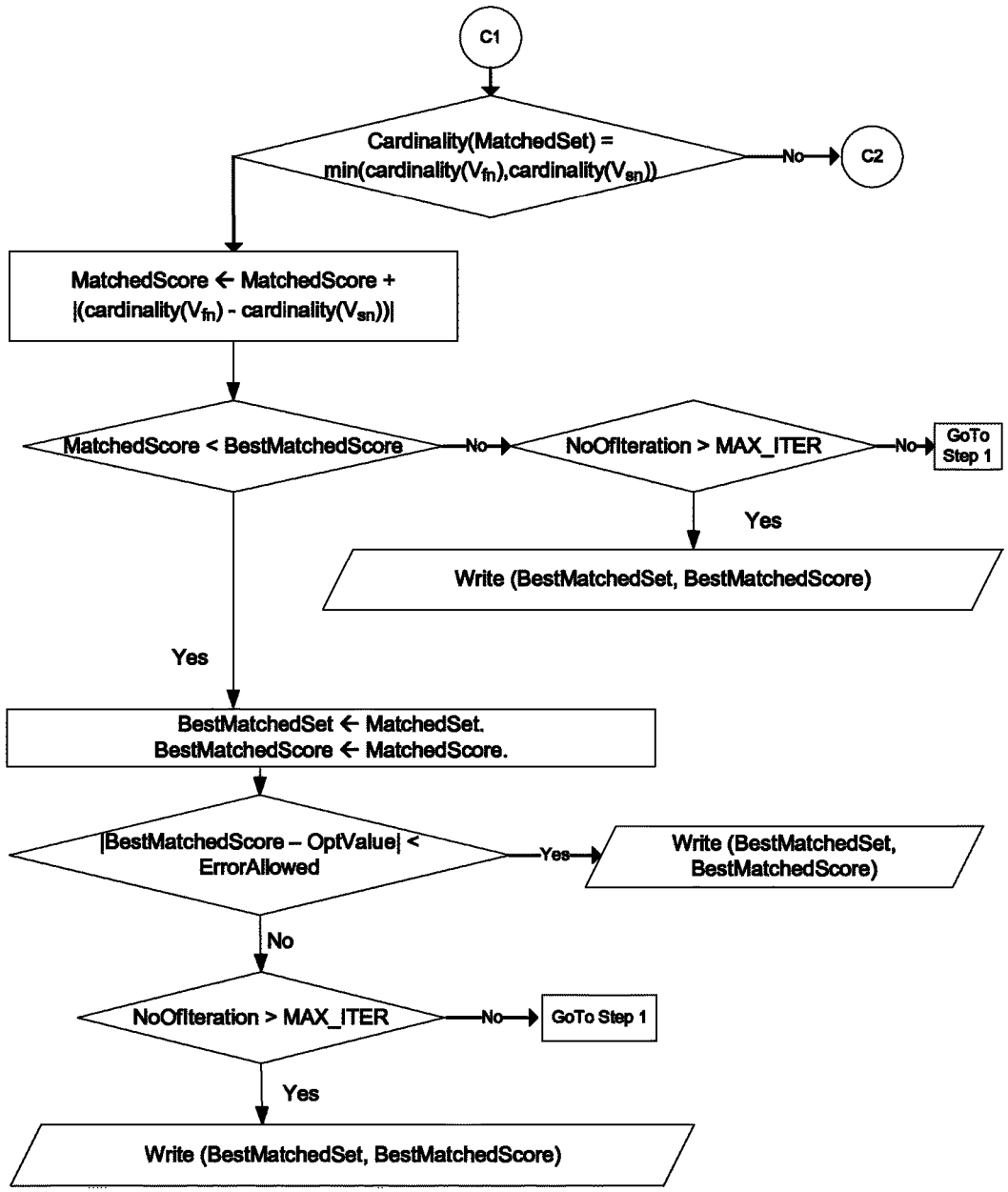
Figure 23:
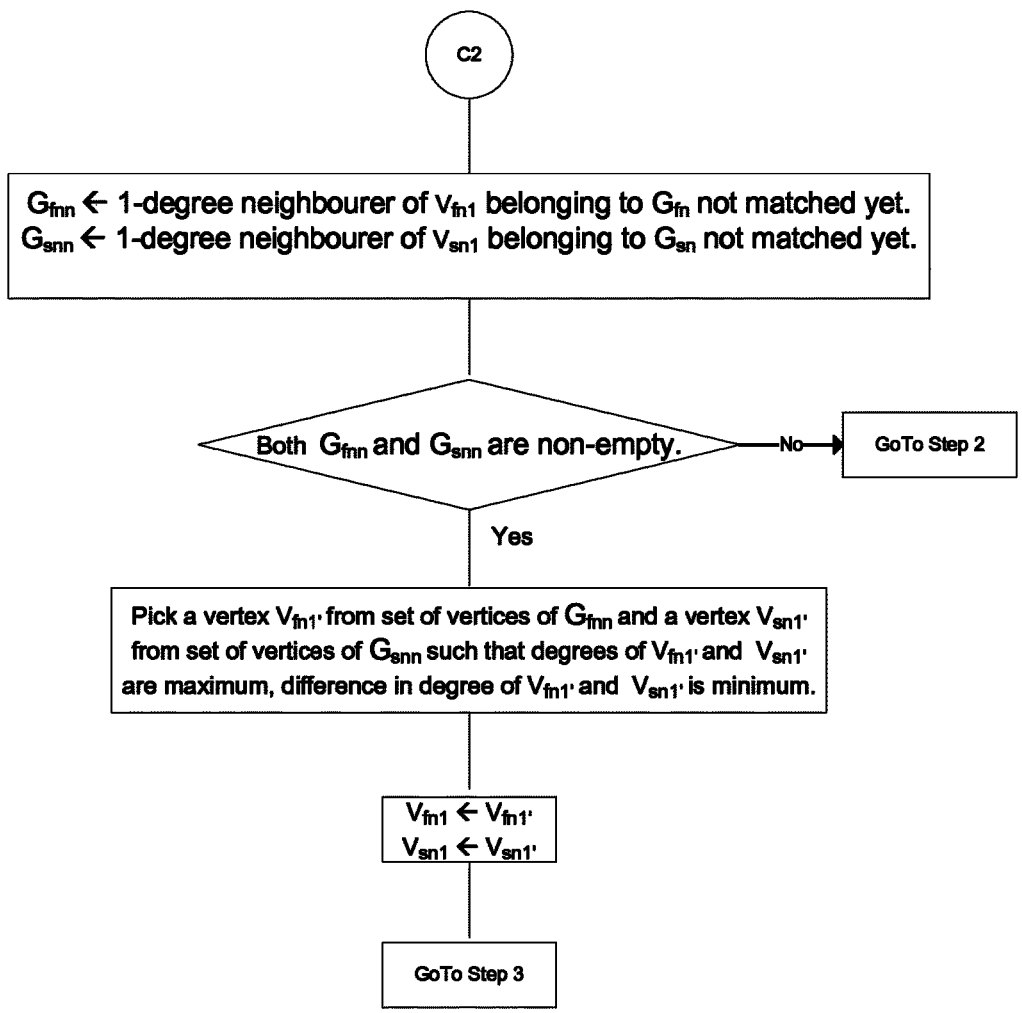

FIGS. 21, 22, 23 show steps of methods for finding a match between two one-degree neighboring graphs with a maximum run time, and outputting a score of the best match, according to at least some embodiments.

Figure 24:
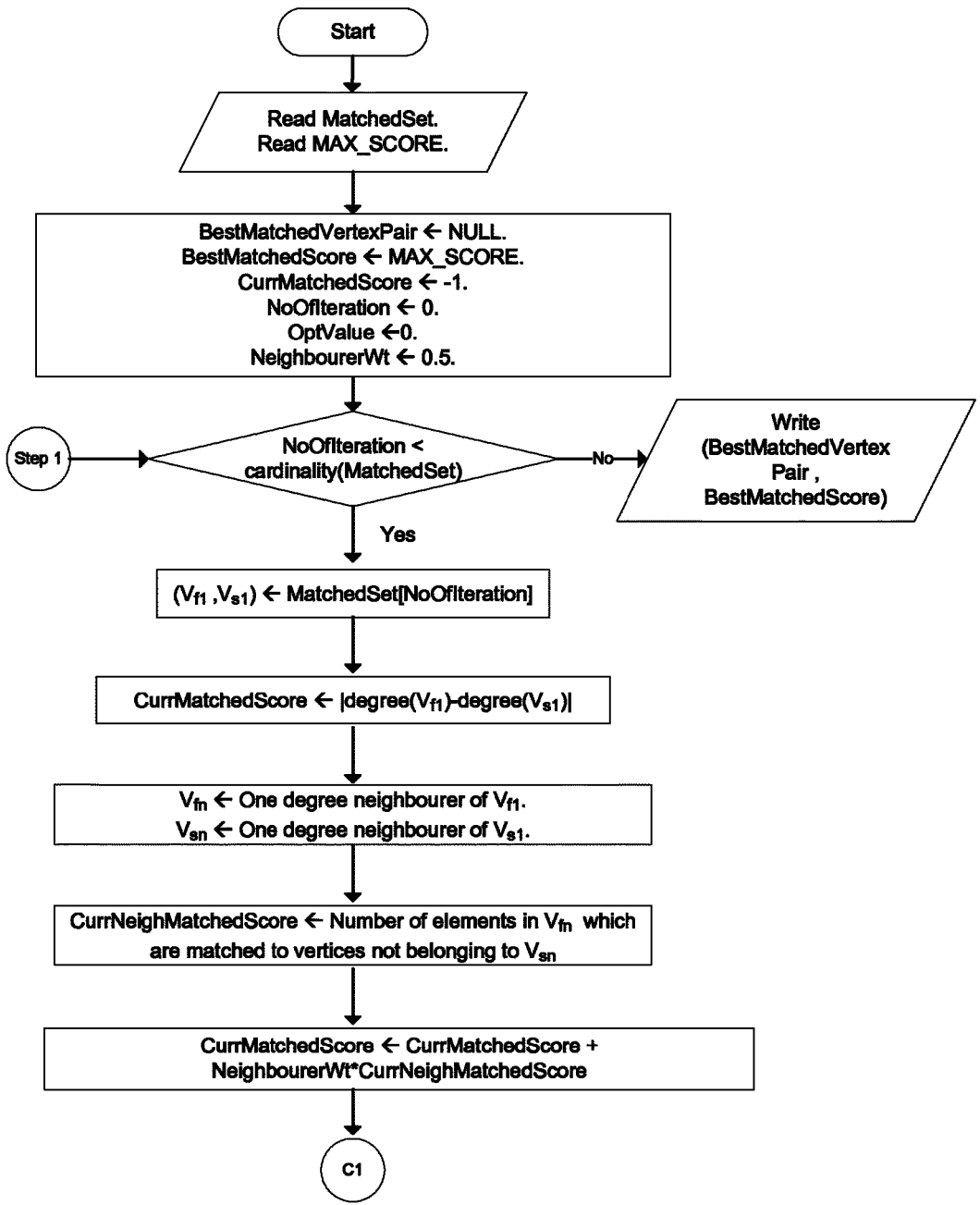
FIGS. 24, 25 show steps of methods for finding best matched vertices between two graphs in which best matching is already known, according to at least some embodiments.
Figure 25:
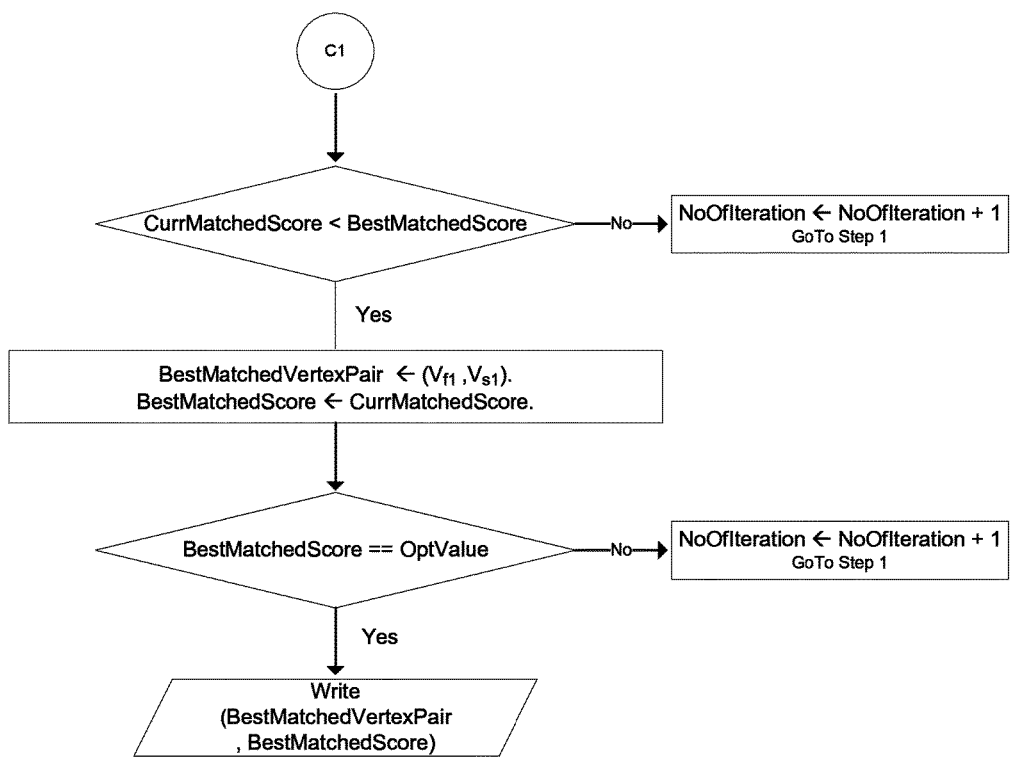

FIGS. 24, 25 show steps of methods of providing a best match between a pair of vertexes of two graphs in which matching of the graphs is already known, according to an embodiment.

Although specific embodiments have been described and illustrated, the described embodiments are not to be limited to the specific forms or arrangements of parts so described and illustrated. The embodiments are limited only by the appended claims.

What is claimed:
1. A method of locating lights of a structure, comprising:
  a plurality of sensor units sensing signals, wherein the plurality of sensor units are associated with a plurality of lights;

generating a sensor graph based on the sensed signals, wherein the graph includes nodes that represent light locations, and edges that represent distances between the lights;

inexact matching of the sensor graph with a floor plan graph of a floor plan of the structure, wherein the floor plan graph includes exact locations of the sensors within the structure, and matching includes placing each of the sensors based on the exact location of the sensors of the floor plan graph and information about the sensors of the sensor graph, wherein the information comprises vertices and estimated distances between the vertices; and controlling lighting of the plurality of lights of the structure based on the sensed signals and based on the inexact matching of the sensor graph with the floor plan;

wherein first-degree neighbors of the vertices of the floor plan graph are known, wherein the first-degree neighbors of the vertices of the sensor graph are estimated based on sensed signals of the sensor, wherein both the floor plan graph and the sensor graph include a same number of vertices.

2. The method of claim 1, wherein the sensor units comprises at least one of light sensors, motion sensors, and LQI (link quality indicator) sensors.

3. The method of claim 2, wherein a sensor sub-graph is generated for each of light sensors, motion sensors and LQI sensors.

4. The method of claim 3, further comprising generating a compiled sensor graph based on synthesis of the sub-graph for each of the light sensors, motion sensors and LQI sensors.

5. The method of claim 4, further comprising generating a first sensor graph $G_{s1}$ based on sensed motion signals, a second sensor graph $G_{s2}$ based on sensed motion signals, a third sensor graph $G_{s3}$ based on sensed LQI and synthesizing the first sensor graph $G_{s1}$, the second sensor graph $G_{s2}$, and the third sensor graph $G_{s3}$ to generate a compiled sensor graph $G_s$.

6. The method of claim 2, wherein a third sensor graph $G_{S3}$ is generated based on electromagnetic signal LQI, comprising:
associating an electromagnetic signal source with one or more of a plurality of LQI sensors;
sensing an LQI by one or more of the LQI sensors;
constructing the third sensor graph $G_{S3}$ based on a value of the LQI at each of the one or more sensors, wherein each LQI sensor is placed on a vertex of the graph $G_{S3}$, and wherein an edge is generated between each vertex that includes a weight that represents a confidence level.

7. The method of claim 2, wherein a first sensor graph $G_{S1}$ is generated based on sensed motion, comprising:
identify motions sensors of a plurality of sensor units that sense motion within a predetermined threshold of time, over a plurality of instances of time;
based on the identified motion sensors, construct the graph $G_{S1}$, wherein each of the motion sensors is placed on a vertex of the graph $G_{S1}$, and an edge between vertices include an edge weight that represents a confidence measure.

8. The method of claim 2, wherein a second sensor graph $G_{S2}$ is generated based on sensed light, comprising:
controlling lighting within an area, wherein a single light within the area is powered to emit light;
sense an intensity of receive light by a plurality of light sensors within the area;
order the light sensors according to the intensity of light received by each of the plurality of light sensors;
construct the second sensor graph $G_{S2}$, wherein each sensor is placed on a vertex of the graph $G_{S2}$ based on a known location of the single light, and the sensed intensity of light received by each of the plurality of light sensors, and wherein an edge is generated between each vertex that includes a weight that represents a confidence level.

9. The method of claim 2, further comprising:
activating a single light within an area, and sensing light by a plurality of light sensors;
receiving a sensed light value of light intensity by each of the light sensors;
ordering the sensed light values of the light sensors, wherein the ordering provides a representation of distances between the single light and the light sensor sensing the light.

10. The method of claim 2, wherein motion sensor sense commonly located motion, and motion sensors are correlated with each other based on timing of the sensed motion.

11. The method of claim 10, further comprising selecting a sampling rate of the sensed motion.

12. The method of claim 2, wherein the LQI sensors sense electromagnetic signals associated with the plurality of sensor units of the plurality of lights.

13. The method of claim 1, further comprising matching vertices of the sensor graph with vertices of the floor plan graph that include a similar edge structure, wherein the sensor graph and the floor plan graph are planar and include vertices having a bounded degree.

14. The method of claim 13, wherein an edge structure is determined based on a number of first degree neighboring vertices, and the similar edge structure is determined as vertices having a same number of first degree neighboring vertices.

15. The method of claim 13, wherein the inexact matching includes:
a. matching a vertex from the sensor graph to a vertex of the floor plan graph, wherein the vertices are determined to have similar topological or structural properties;
b. computing a cost of the matching of the vertex from the sensor graph to the vertex of the floor plan graph as a measure of a difference in topology or structure of the vertex from the sensor graph and the vertex of the floor plan graph;
c. match one-degree neighboring graphs of the matched vertices based on a topology or structural;
d. matching a next vertex pair, wherein the next vertex pair belongs to the one-degree neighboring graphs which have similar topological or structural properties; and
e. determining a match to be acceptable if a cost of matching is below a threshold value.

16. The method of claim 15, wherein the vertices are determined to have similar topological or structural properties based on a determination of a difference in degree of vertices.

17. The method of claim 15, wherein computing the cost of the matching of the vertex from the sensor graph to the vertex of the floor plan graph comprises computing a sum of difference in degree of vertices, and a matching of one-degree neighboring graphs.

18. The method of claim 15, wherein one-degree neighboring graphs are matched, ensuring that a sum of degree difference between matched vertices is below a value.

19. The method of claim 18, wherein, the value is based on a sum of difference of edge count and vertex count, and further based on an allowable deviation of a square root vertex count.

20. The method of claim 15, wherein the cost of matching the sensor graph with the floor plan graph is based on a sum of cost of matched vertices.

21. The method of claim 15, wherein the acceptable cost of matching the sensor graph with the floor plan graph is based on a difference in edge count and further based on an allowed deviation of a square root vertex count.

22. The method of claim 15, further comprising first manually matching corner vertices and one or more central vertices, thereby improving efficiency with respect to time and correctness of the inexact matching.

23. The method of claim 1, further comprising identifying vertices of the floor plan graph that include unique characteristics, and matching vertices of the sensor graph that includes the unique characteristics.

24. The method of claim 1, further comprising first matching vertices of the sensor graph that include confidence levels above a threshold, and subsequently matching vertices of the sensor graph that include confidence levels below the threshold.

25. The method of claim 1, further comprising scoring a quality of the matching based on at least one of:
   a. a difference in a cardinality of an edge set of the floor plan graph and the sensor graph;
   b. a cardinality of a vertex set of the floor plan graph and the sensor graph;
   c. a measure of a dis-similarity in an edge structure of the floor plan graph and the sensor graph.

26. The method of claim 1, further comprising:
selecting a vertex of the floor plan graph to match a vertex of the sensor graph, wherein a degrees of the vertex of the floor plan graph and a degrees of the vertex of the sensor graph are a maximum, and a difference between the degrees of the vertex of the floor plan graph and the degrees of the vertex of the sensor graph are a minimum, and the vertex of the floor plan graph and the vertex of the sensor graph have not been previously matched, wherein the degrees reflects a number of neighboring vertices.

27. A building control system, comprising:
a plurality of sensors;
a plurality of lights associated with the plurality of sensors;
a controller, the controller operative to:
   receive sense signals from the plurality of sensors;
   generate a sensor graph based on the sensed signals, wherein the graph includes nodes that represent light locations, and edges that represent distances between the lights;
   perform inexact graph matching between a floor graph and the sensor graph to provide automatic commissioning of the plurality of lights based on the sensed signals of the plurality of sensors;
   wherein the floor plan graph includes exact locations of the sensors within the structure, and matching includes placing each of the sensors based on the exact location of the sensors of the floor plan graph and information about the sensors of the sensor graph, wherein the information comprises vertices and estimated distances between the vertices; and
control lighting of the plurality of lights of the structure based on the sensed signals and based on the inexact matching of the sensor graph with the floor plan;
wherein first-degree neighbors of the vertices of the floor plan graph are known, wherein the first-degree neighbors of the vertices of the sensor graph are estimated based on sensed signals of the sensor, wherein both the floor plan graph and the sensor graph include a same number of vertices.

* * * * *